(12) United States Patent
Yo et al.

(10) Patent No.: US 7,711,453 B2
(45) Date of Patent: May 4, 2010

(54) POSITIONING CONTROL SYSTEM AND FILTER

(75) Inventors: Seikai Yo, Toride (JP); Kazuo Nakano, Komae (JP); Nobuhiro Fujiwara, Moriya (JP); Hiroshi Miyachi, Tokyo (JP); Masatoshi Hatakeyama, Machida (JP)

(73) Assignee: SMC Kabushiki Kaisha, Tokyo (JP)

( * ) Notice: Subject to any disclaimer, the term of this patent is extended or adjusted under 35 U.S.C. 154(b) by 496 days.

(21) Appl. No.: 11/626,578

(22) Filed: Jan. 24, 2007

(65) Prior Publication Data

US 2007/0191967 A1    Aug. 16, 2007

(30) Foreign Application Priority Data

Feb. 13, 2006    (JP) ............... 2006-035302

(51) Int. Cl.
*G05D 7/00* (2006.01)
*F16K 35/00* (2006.01)
*G05B 13/02* (2006.01)

(52) U.S. Cl. ..................... 700/282; 251/89; 700/44
(58) Field of Classification Search ................... 700/282
See application file for complete search history.

(56) References Cited

U.S. PATENT DOCUMENTS

| | | | | |
|---|---|---|---|---|
| 4,647,960 A * | 3/1987 | Miura et al. | ............... | 348/628 |
| 5,818,651 A | 10/1998 | Nomura | | |
| 5,980,080 A * | 11/1999 | Loparo et al. | ............... | 700/55 |
| 7,049,879 B2 * | 5/2006 | Osamura et al. | ............ | 327/419 |
| 7,076,314 B2 | 7/2006 | Saitou | | |
| 7,284,370 B2 * | 10/2007 | Tatsukawa | ................... | 60/324 |
| 2002/0134956 A1 * | 9/2002 | Smith et al. | ............ | 251/129.04 |
| 2004/0193327 A1 * | 9/2004 | Yakushi | ..................... | 700/282 |
| 2009/0143871 A1 * | 6/2009 | Gao et al. | ..................... | 700/29 |

FOREIGN PATENT DOCUMENTS

| | | |
|---|---|---|
| JP | 10-240305 | 9/1998 |
| JP | 11-055979 | 2/1999 |
| JP | 2000-347738 | 12/2000 |
| JP | 2004-144196 | 5/2004 |
| JP | 2005-63205 | 3/2005 |
| JP | 2005-242715 | 9/2005 |

OTHER PUBLICATIONS

Suzuki et al., Anti-Windup Control Using Saturated State Observer, IEEE, 1998.*

(Continued)

*Primary Examiner*—Ramesh B Patel
*Assistant Examiner*—Darrin Dunn
(74) *Attorney, Agent, or Firm*—Paul A. Guss

(57) ABSTRACT

A positioning control system has a disturbance observer for estimating a disturbance from a displaced distance of a cylinder of a controlled object, and feeding back an estimated disturbance. The positioning control system also includes a saturation element and a low-pass element disposed in a feedback loop including the disturbance observer, and a saturated value changer for changing a saturated value of the saturation element based on a deviation. The saturation element is disposed in a forward path of a positive-feedback minor loop, whereas the low-pass element is disposed in a feedback path of the positive-feedback minor loop.

8 Claims, 35 Drawing Sheets

OTHER PUBLICATIONS

Chang et al., The Development of Anti-windup Scheme and Stick-Slip Compensator for Time Delat Control, AACC, 1998.*

Gao et al., A Windup Restraint Control of Disturbance Observer System for Saturation of Actuator Torque, IEEE, 1999.*

Osamu Oyama et al., "Viscoelasticity in Displacement of a Pneumatic Cylinder and its Effect on Control Performance," p. 24 (160) of Collected Papers, vol. 29, No. 7, Japan Fluid Power System Society, Nov. 1998.

* cited by examiner

POSITIONING CONTROL SYSTEM AND FILTER

BACKGROUND OF THE INVENTION

1. Field of the Invention

The present invention relates to a positioning control system having a disturbance observer for estimating a disturbance from at least one observed value of a controlled object and feeding back an estimated disturbance. The present invention also relates to a filter that is used in such a positioning control system.

2. Description of the Related Art

Positioning control systems are widely used in production facility equipment. In clean room environments, particularly, pneumatic cylinders employed by positioning control systems are highly advantageous, since they are free of liquid leakage and can easily be serviced for maintenance.

However, pneumatic cylinders do not lend themselves to highly accurate and highly rigid positioning owing to their behavior, on account of air compressibility and limitations on the pneumatic pressure that can be used. In particular, a pneumatic cylinder having a seal mounted on a piston, for preventing leakage of air and entry of external foreign matter, is unable to perform highly accurate positioning due to a so-called stick slip phenomenon caused by frictional forces of the seal.

Japanese Laid-Open Patent Publication No. 2004-144196 discloses a positioning system comprising a pneumatic cylinder, which includes a piston incorporating a static pressure bearing in order to reduce frictional forces and provide increased positioning accuracy.

For increased control accuracy, some applications employ a disturbance observer for estimating a disturbance from at least one observed value of a controlled object and feeding back the estimated disturbance. For example, Japanese Laid-Open Patent Publication No. 2000-347738 reveals a positioning system employing a variable-gain disturbance observer for stably controlling an object irrespective of whether static friction or dynamic friction is involved in moving the object.

It is known in the art that it is effective to increase a control gain in order to increase positioning control accuracy. However, in order to protect the actuator, it is necessary to provide a suitable saturating element for preventing the command values from becoming too large.

The viscoelastic characteristics due to frictional forces of a seal in a pneumatic cylinder and the effect of such characteristics on control performance are described in "Viscoelasticity in Displacement of a Pneumatic Cylinder and its Effect on Control Performance," by Osamu Oyama et al., a collection of articles of the Japan Fluid Power System Society, November 1998, Vol. 29, No. 7, pp. 19(155)-25(161). The article shows that the viscoelasticity of a seal is effective for stabilizing piston displacement more than when the piston slides, and it is possible, using this effect, to increase control sensitivity and thereby increase settling speed, so that displacement of the piston can be stabilized as a result of such viscoelasticity.

The positioning system disclosed in Japanese Laid-Open Patent Publication No. 2004-144196 is complex in structure and highly expensive, since it employs a static pressure bearing. Since the static pressure bearing causes too small an amount of friction, it has poor damping characteristics, tending to increase the convergence time for positioning.

The disturbance observer employed by the positioning system disclosed in Japanese Laid-Open Patent Publication No. 2000-347738 generally includes a low-pass filter, and exhibits its integrator characteristics in a low frequency range. It is also known in the art that if a control system includes an integrator, then it suffers from a phenomenon known as integrator windup.

Integrator windup is a situation where, when a given positive deviation is steadily applied, the positive deviation is integrated excessively beyond a saturated value L of the manipulated variable applied to a controlled object, as shown in FIG. 35 of the accompanying drawings. If a negative deviation is steadily applied after time T1, then it is desirable under normal circumstances for the manipulated variable to be reduced immediately from time T1, as indicated by the broken-line curve 1. However, because of windup, the manipulated variable starts being reduced from an integral S, at time T1, as indicated by the solid-line curve 2, and the controlled object actually changes its operation from time T2. Therefore, the manipulated variable remains saturated at the saturated value L from time T1 to time T2. The controlled object thus suffers a delay in its operation, tending to result in a reduction in its control performance, e.g., increased overshooting. In order to protect the control system against integrator windup, the integrator may have a function to stop its integrating action beyond the saturated value L.

A simple integrator may relatively easily be designed to incorporate a means for stopping its integrating action beyond the saturated value L. However, no attempts have heretofore been made to add such a means to a disturbance observer, and to determine a location where such a means is provided with respect to a disturbance observer. Hence, it has not been possible to prevent integrator windup in disturbance observers.

SUMMARY OF THE INVENTION

It is an object of the present invention to provide a positioning control system incorporating a disturbance observer for increasing control accuracy and preventing integrator windup, as well as to provide a filter for use in such a positioning control system.

According to an aspect of the present invention, there is provided a positioning control system comprising a disturbance observer for estimating a disturbance from at least one observed value of a controlled object and feeding back an estimated disturbance, and a saturation element disposed in a feedback loop for feeding back the estimated disturbance from the disturbance observer, the feedback loop having a main loop based on an output value of the controlled object, and a minor loop for performing positive feedback based on a predetermined parameter, wherein the saturation element is disposed in the minor loop.

The positioning control system produces an integrator windup, which is restrained for an increased control capability, with the saturation element disposed in the positive-feedback minor loop of the disturbance observer. The disturbance observer operates to compensate for the disturbance in order to highly accurately and rigidly position the controlled object.

The minor loop may perform the positive feedback through two subtractors.

The saturation element may be saturated with positive and negative values whose absolute values are equal to each other.

If the positioning control system has a saturated value changer for changing a saturated value of the saturation element based on a control deviation, then the saturated value is appropriately set based on the control variation, thereby providing an increased control capability.

The controlled object may comprise a cylinder having a seal on a slidable component thereof, and the saturated value of the saturation element may have an absolute value that is greater when the control deviation falls outside of the viscoelastic displacement range of the seal than when the control deviation falls within a viscoelastic displacement range of the seal. If the control deviation is small, then a small saturated value is set for sufficiently restraining integrator windup. If the control deviation is large, then a large saturated value is set for enabling increased dynamic characteristics.

The cylinder may comprise a pneumatic cylinder.

If the seal comprises a piston seal and a cap seal, then a viscoelastic displacement range may be established based on a hypothetical combined seal, including the piston seal and the cap seal.

The cylinder may be bidirectionally actuatable by a proportional valve.

If the saturated value changer changes the saturated value stepwise based on the control deviation, then the saturated value can easily be calculated.

According to another aspect of the present invention, there is also provided a filter in a control system having a main feedback loop, comprising a minor loop for performing positive feedback within the main feedback loop, a low-pass element disposed in a feedback path of the minor loop, and a saturation element disposed in a forward path of the minor loop.

The filter operates in the same manner as an integrating process so as to restrain integrator windup, with the low-pass element being disposed in the feedback path of the minor loop and the saturation element being disposed in the forward path thereof.

As described above, in the positioning control system according to the present invention, integrator windup is restrained for enabling increased control capability, with the saturation element being disposed in the positive-feedback minor loop of the disturbance observer. The disturbance observer operates to compensate disturbances, so as to highly accurately and rigidly position the controlled object.

As described above, the filter according to the present invention operates in the same manner as an integrating process so as to restrain integrator windup, with the low-pass element being disposed in the feedback path of the minor loop and the saturation element being disposed in the forward path thereof.

The above and other objects, features, and advantages of the present invention shall become more apparent from the following description when taken in conjunction with the accompanying drawings in which preferred embodiments of the present invention are shown by way of illustrative example.

DESCRIPTION OF THE PREFERRED EMBODIMENTS

Positioning control systems and filters according to embodiments of the present invention shall be described below with reference to FIGS. 1 through 34.

Figure 1:
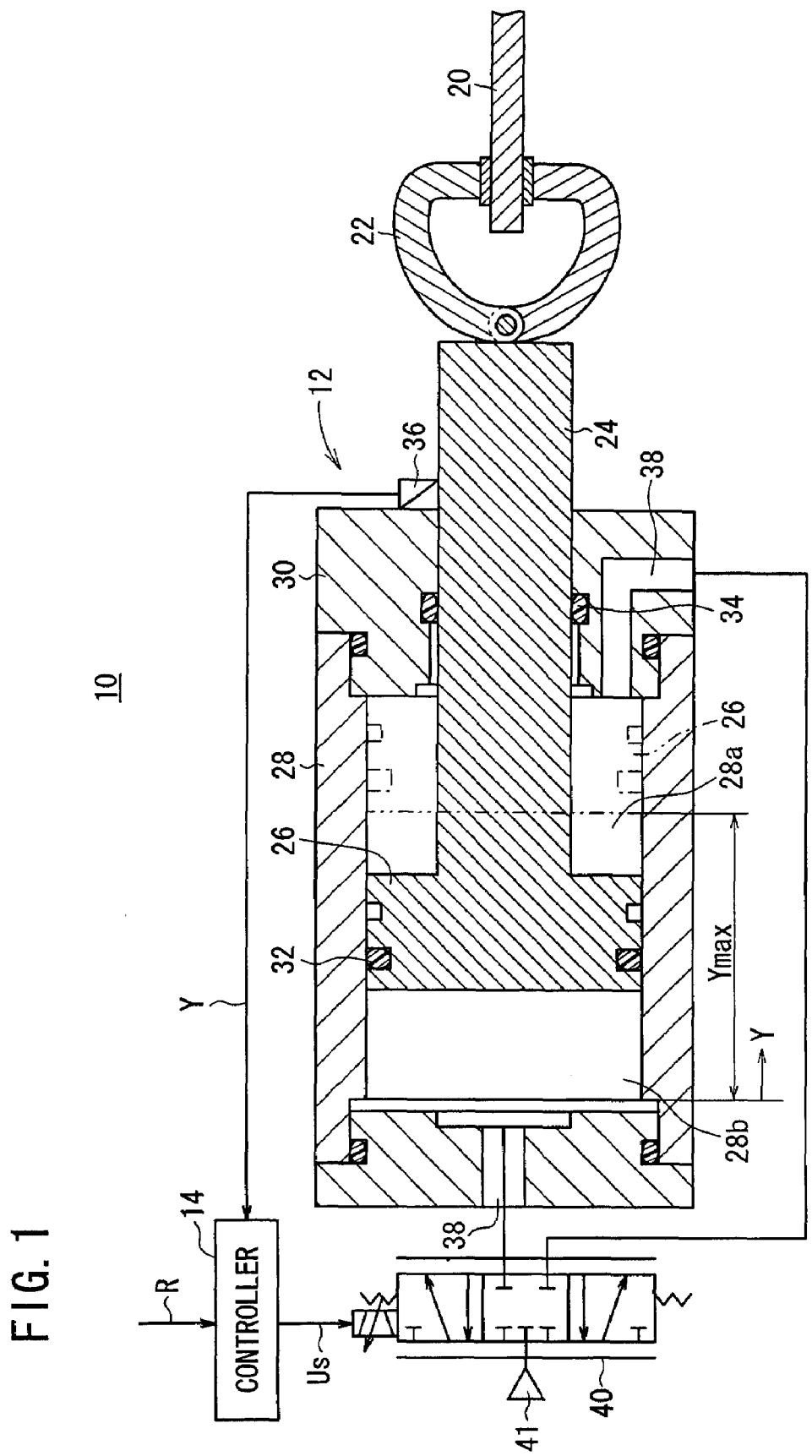
FIG. 1 is a block diagram, partly in cross section, of a positioning control system according to an embodiment of the present invention.

As shown in FIG. 1, a positioning control system 10 according to an embodiment of the present invention generally comprises a pneumatic cylinder 12 and a proportional valve 40 as a controlled object P, and a controller 14 for controlling the pneumatic cylinder 12. According to the present embodiment, the controller 14 incorporates a saturated positive-feedback filter 110 (see FIG. 7).

The pneumatic cylinder 12 is used, for example, to position a workpiece 20 in a clean room of a semiconductor fabrication factory. The pneumatic cylinder 12 has a grip 22 for gripping the workpiece 20, a rod 24 supporting the grip 22 on one end thereof, a piston 26 mounted on the other end of the rod 24, a tube 28 in which the piston 26 slidably moves, a cap 30 mounted on an end of the tube 28 and supporting the rod 24, a piston seal 32 disposed around the piston 26, a cap seal 34 mounted on the cap 30, and a sensor 36 for detecting a displaced distance Y of the rod 24. The piston 26 is a single-sided rod type piston. The tube 28 is divided by the piston 26 into a rod chamber 28a, in which the rod 24 is disposed, and a bottom chamber 28b opposite to the rod chamber 28a across the piston 26. The rod chamber 28a and the bottom chamber 28b are held in fluid communication with respective ports 38. The ports 38 are controlled by a proportional valve 40 for selective fluid control. The proportional valve 40 is controlled by the controller 14 to supply compressed air from an air pressure source 41 to one of the ports 38, and to vent the other port 38 to atmosphere. The piston 26 is slidingly movable within the tube 28 to a maximum displaced distance Ymax.

Figure 2:
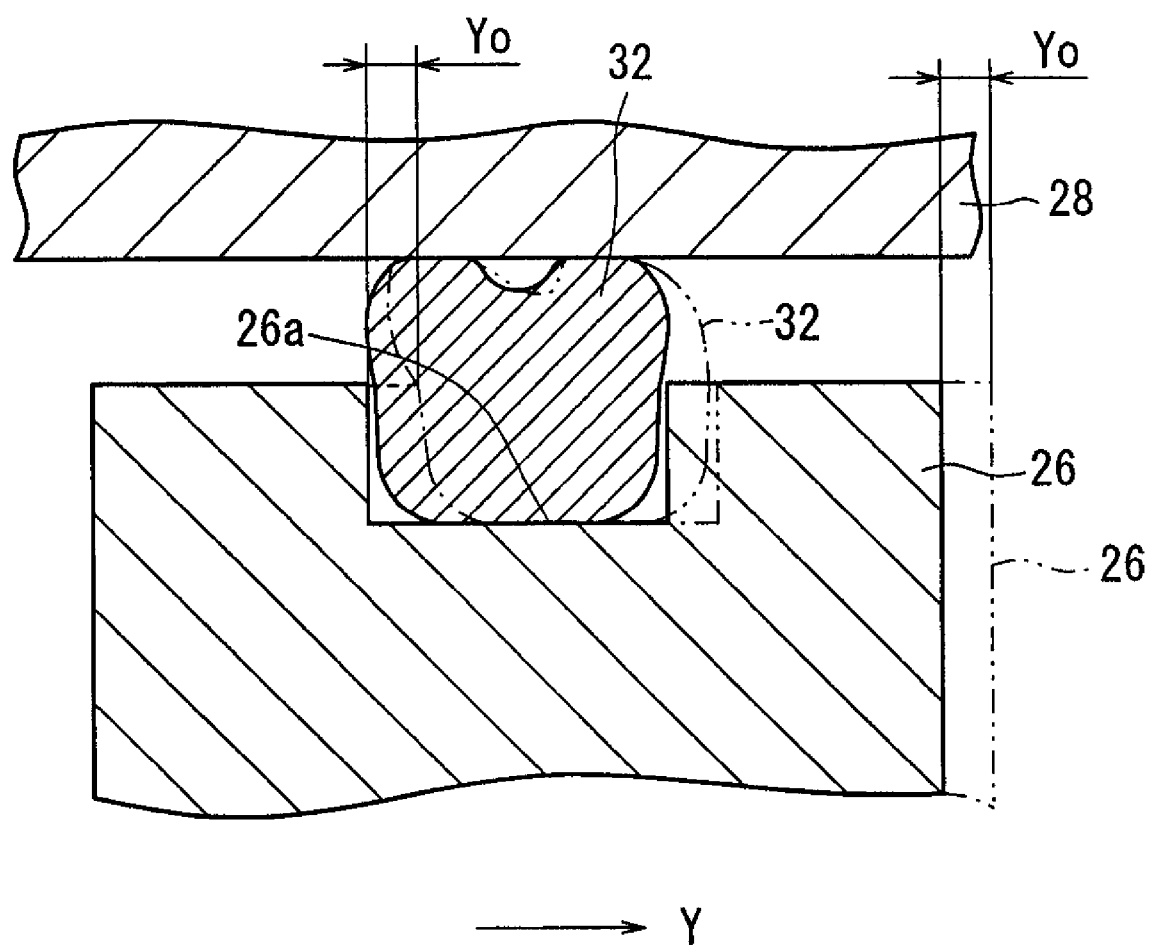
FIG. 2 is an enlarged fragmentary cross-sectional view of a piston.

As shown in FIG. 2, the piston seal 32 serves to prevent leakage of air between the rod chamber 28a and the bottom chamber 28b. The piston seal 32 has an inner circumferential portion, which is fitted into an annular groove 26a defined in an outer circumferential surface of the piston 26, and an outer circumferential portion that is slightly compressed and held against an inner circumferential surface of the tube 28. The piston seal 32 may comprise any of various configurations, and should preferably have a substantially O-shaped cross section, or a substantially X-shaped cross section, depending on the design conditions.

When the rod 24 is still at rest, the outer circumferential portion of the piston seal 32 is held against the inner circumferential surface of the tube 28 and undergoes a static frictional force. Therefore, when the bottom chamber 28b is pressurized to move the piston 26 slightly toward the cap 30, the outer circumferential surface of the piston seal 32 remains unmoved under the static frictional force, and is viscoelastically deformed as the rod 24 is displaced. When the rod 24 is further moved until the pressure applied to the piston 26 exceeds the static frictional force imposed thereon by the piston seal 32, the piston seal 32 starts to move, and the tube 28 experiences a dynamic frictional force that is smaller than the static frictional force. The pneumatic cylinder 12 operates similarly when the rod chamber 28a is pressurized to move the piston 26 away from the cap 30.

As described above, while the piston 26 and the rod 24 are moving in a viscoelastic displacement range Yo due to the viscoelasticity of the piston seal 32, i.e., within a range in which the piston seal 32 is elastically deformed but is held at rest without sliding against the tube 28, a resistive force is generated due to the viscoelasticity of the piston seal 32, which provides appropriate damping characteristics. In addition to the piston seal 32 that has been described above, the cap seal 34 also provides similar damping characteristics, because it is viscoelastically held against the rod 24. Therefore, the viscoelastic displacement range Yo is determined by the combined viscoelasticity of the piston seal 32 and the cap seal 34.

Figure 3:
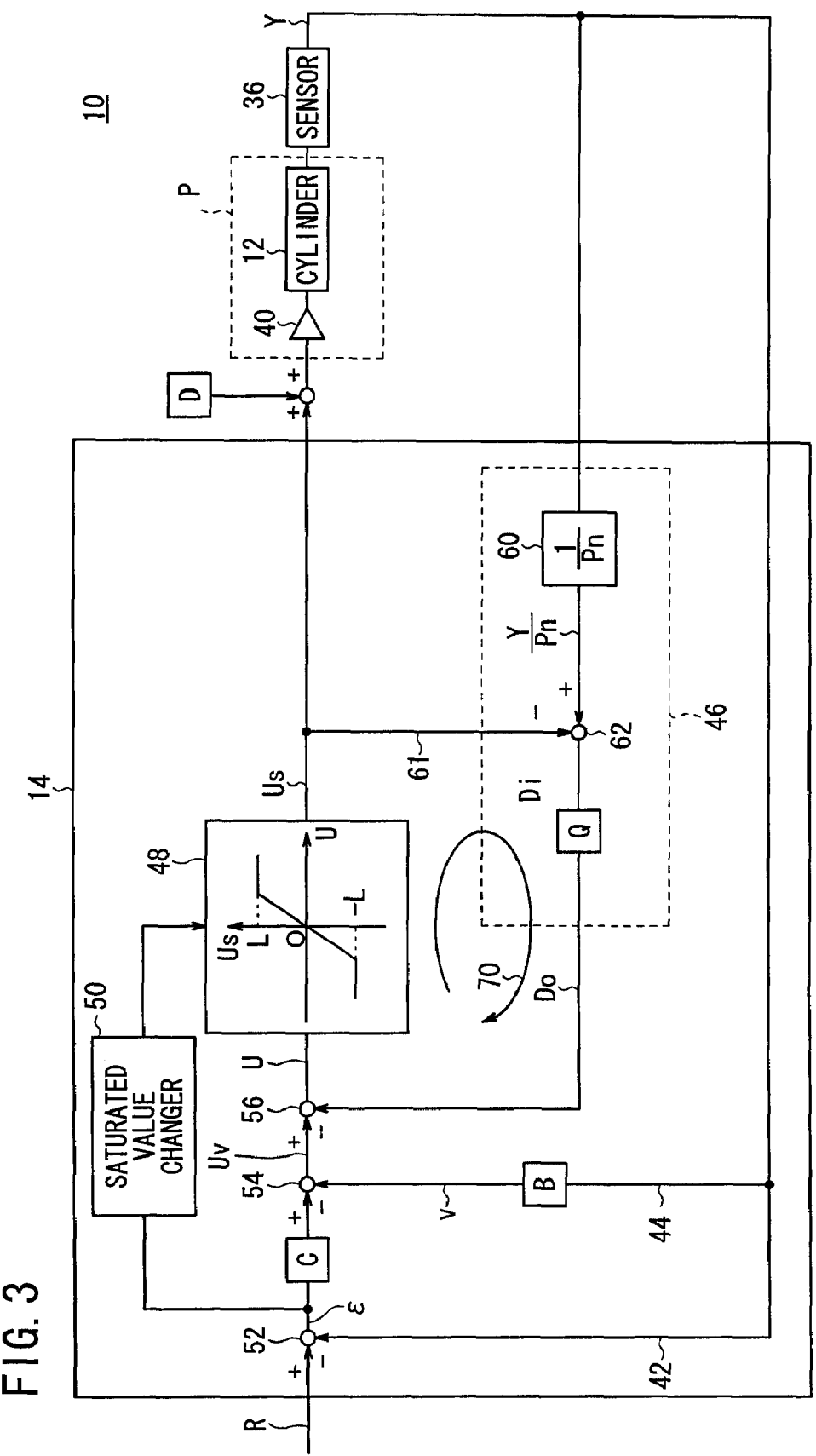
FIG. 3 is a block diagram of a controller.

As shown in FIG. 3, the controller 14 comprises a position feedback loop 42, a speed feedback loop 44, a disturbance observer 46, a saturation element 48 (also referred to as a limiter), and a saturated value changer 50. A first subtractor 52 subtracts the displaced distance Y from a command value R to determine a deviation (control deviation) $\epsilon$. The displaced distance Y is supplied from the sensor 36. The deviation $\epsilon$ is converted by an element C into a parameter C·$\epsilon$, which is supplied to a second subtractor 54. The element C amplifies the deviation $\epsilon$ and performs a predetermined compensating process on the deviation $\epsilon$.

The speed feedback loop 44 includes a differentiating element B for differentiating the displaced distance Y in order to determine a speed v. A second subtractor 54 subtracts the speed v from the parameter C·$\epsilon$ to determine a parameter Uv, which is supplied to a third subtractor 56.

The disturbance observer 46 comprises a known control means for estimating a parameter Do from the displaced distance Y as observed by the sensor 36 and a manipulated variable (a given parameter) Us for the controlled object P, and feeding back the estimated parameter Do. The disturbance observer 46 comprises an element 60 for processing the displaced distance Y, a fourth subtractor 62, and an element Q. The element 60 performs a process represented by 1/Pn, i.e., the element 60 determines a parameter Y/Pn by dividing the displaced distance Y by Pn, and supplies the parameter Y/Pn to the fourth subtractor 62. The parameter Pn represents a model that approximates the controlled object P with an nth-order function. If the model Pn has an appropriate level of accuracy, and there is no disturbance D (D=0), then the displaced distance Y is expressed as Y←Us·P. Therefore, the parameter Y/Pn is expressed as Y/Pn=Us (≈Us·P/Pn).

The fourth subtractor 62 subtracts the manipulated variable Us from the parameter Y/Pn in order to determine a parameter Di, and supplies the parameter Di to the element Q. The element Q is a low-pass element. The element Q performs a low-pass process on the parameter Di in order to determine a parameter Do (hereinafter referred to as an estimated disturbance value Do), and supplies the parameter Do to the third subtractor 56. If the element Q is expressed by a transfer function, then its denominator degree is set to a value equal to or greater than the denominator degree of Pn.

The third subtractor 56 subtracts the parameter Do from the parameter Uv in order to determine a basic manipulated variable U, and supplies the basic manipulated variable U to the saturation element 48. The saturation element 48, the fourth subtractor 62, the element Q, and the third subtractor 56 jointly make up a minor loop 70. In the minor loop 70, the manipulated variable Us acts as the subtrahend in the fourth subtractor 62, and then goes through the element Q and acts again as the subtrahend in the third subtractor 56. Therefore, the process in the minor loop 70 is equivalent to a process of multiplying "−1" twice and hence multiplying "1" once. Consequently, the minor loop 70 is a positive-feedback loop. The low-pass element Q is placed in a feedback path of the positive-feedback minor loop 70, whereas the saturation element 48 is placed in a forward path of the positive-feedback minor loop 70.

The saturation element 48 limits the basic manipulated variable U with the saturated value L if the basic manipulated variable U exceeds a positive value of the saturated value L, and further limits the basic manipulated variable U with a negative value −L of the saturated value L if the basic manipulated variable U is smaller than the negative value −L. Therefore, the limited manipulated variable Us falls within a range of −L<Us<L. If the basic manipulated variable U is not limited, then U=Us (the gain is 1). The positive and negative saturated values L and −L are changed by the saturated value changer 50 depending on the absolute value of the deviation ε. Operational details of the saturated value changer 50 shall be described later.

Since the manipulated variable Us is supplied to the proportional valve 40, the piston 26 of the cylinder 12 is actuated such that the command value R equals the displaced distance Y (R=Y).

If there is no disturbance D, then Y/Pn=Us. Therefore, the parameters Di and Do are nil, and the feedback process of the disturbance observer 46 does not operate, with the result that the controlled object P is positionally controlled by the position feedback loop 42 and the speed feedback loop 44, in the same manner as a classical control system.

Actually, however, the controlled object P suffers an error due to the disturbance D, wherein the disturbance D is compensated for by the disturbance observer 46. Specifically, if the disturbance D is not nil (D≠0), then the parameter Di has a value depending on the disturbance D. The parameter Di is processed in accordance with a low-pass process by the element Q to result in the parameter Do, which is subtracted from the parameter Uv by the third subtractor 56. Even if the parameter Uv is nil, the parameter Do, depending on the disturbance D, produces values Us=U=−Do (not limited with the threshold by the saturation element 48), Us=L (limited with the positive threshold by the saturation element 48), or Us=−L ((limited with the negative threshold by the saturation element 48), which control the controlled object P so as to cancel out the disturbance D.

Simulations for confirming operations of the positioning control system 10 thus constructed shall be described below with reference to FIGS. 4 through 32. The simulations have been carried out by the inventor of the present invention using a computer, for the purpose of confirming the effects of the saturation element 48 provided mainly within the minor loop 70.

1) Positive-Feedback Filter:

First, a positive-feedback filter 100 (see FIG. 4), which is obtained by removing the saturation element 48 from the minor loop 70 and adding a proportional element ka instead, will be analyzed. For generalizing the filter arrangement, a proportional element kq is inserted into a path leading to the input of the positive-feedback filter 100.

Figure 4:
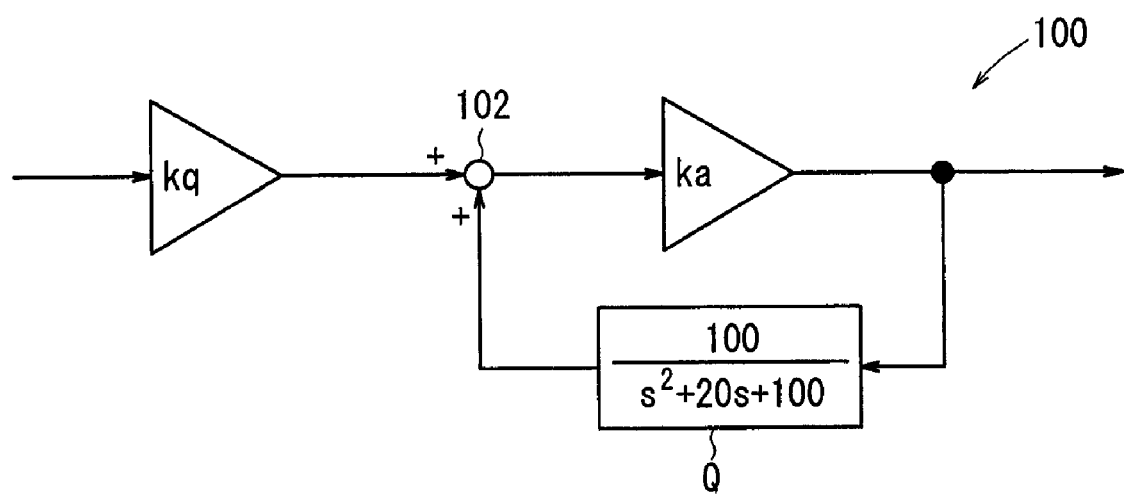
FIG. 4 is a block diagram of a positive-feedback filter.

As shown in FIG. 4, the positive-feedback filter 100 has a proportional element kq in the input stage, an adder 102, a proportional element ka in the loop, and an element Q in the loop. The loop Q is a low-pass element. The proportional element ka is placed in a forward path of the loop, whereas the element Q is placed in a feedback path of the loop. An output from the element Q is added to an output from the proportional element kq by the adder 102. The positive-feedback filter 100 has a transfer function G(s) expressed by the following equation (1):

$$G(s) = kq \frac{ka}{1 - kaQ} \quad (1)$$

Assuming the element Q is typically given as Q=100/(s+10)², ka=1, and kq=0.2, then the transfer function G(s) is given as follows:

$$G(s) = \frac{20}{100} \cdot \frac{s^2 + 20s + 100}{s(s + 20)} \quad (2)$$

$$= \frac{0.01s^2 + 0.2s + 1}{s(0.05s + 1)}$$

$$= kq \frac{ka(s^2 + 20s + 100)}{s^2 + 20s + 100(1 - ka)}$$

Figure 5:
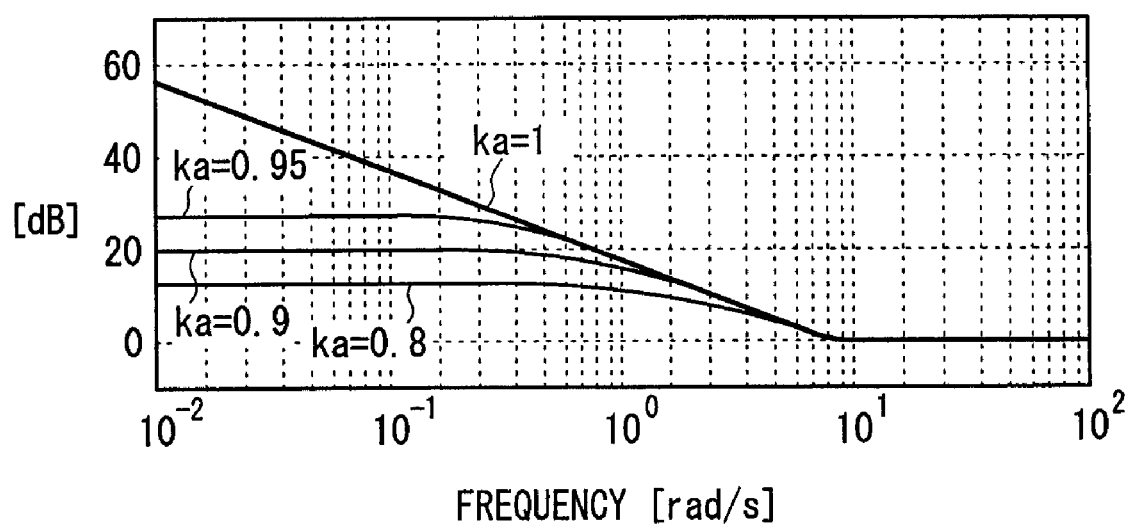
FIG. 5 is a Bode diagram showing gain characteristics of the positive-feedback filter.
Figure 6:
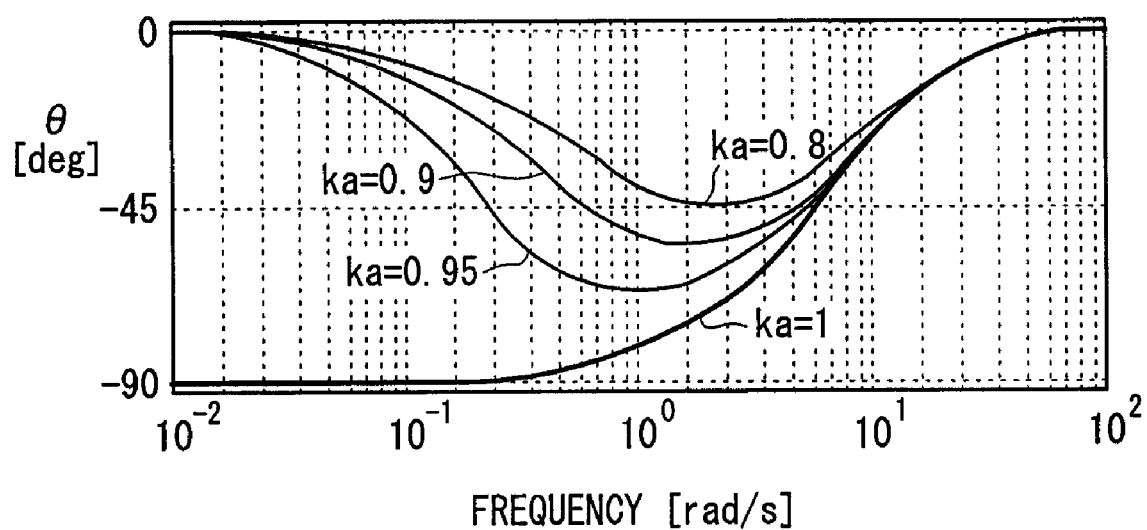
FIG. 6 is a Bode diagram showing phase characteristics of the positive-feedback filter.

It can be seen from equation (2) that the positive-feedback filter 100 has a proper transfer function with a pole at the origin, and has characteristics equal to an integrator of 1/s in a low frequency range. If ka≠1, then the positive-feedback filter 100 has no origin pole, and has a stable and proper transfer function, exhibiting characteristics similar to those of an ordinary phase delay compensating circuit. Frequency characteristics of the positive-feedback filter 100 are shown in FIGS. 5 and 6.

If ka=1, then the positive-feedback filter 100 is equivalent to the form 1/(1−Q) of the minor loop 70 of the disturbance observer 46.

Figure 7:
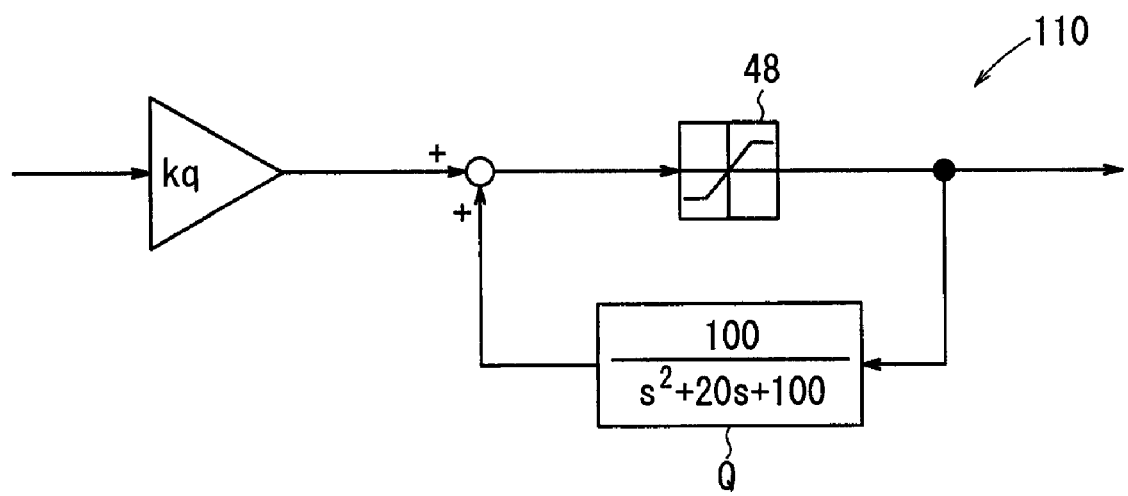
FIG. 7 is a block diagram of a saturated positive-feedback filter.

2) Saturated Positive-Feedback Filter:

As shown in FIG. 7, a saturated positive-feedback filter 110 having a saturation element 48 with a neutral gain of 1, which is inserted in place of the proportional element ka in the forward path of the positive-feedback filter 100 shown in FIG. 4, shall be analyzed below. The saturated positive-feedback filter 110 is equivalent in configuration to the minor loop 70.

When the magnitude of an input of the saturation element 48 is in an unsaturated range near a neutral point, the saturated positive-feedback filter 110 has frequency characteristics equal to those of the positive-feedback filter 100 shown in FIG. 4 in which ka=1, and has a pole at the origin.

If the input of the saturation element 48 is represented by x, and the output thereof by y, then y=x in an unsaturated range of |x|<x0, y=x0 in a saturated range of x>x0, and y=−x0 in a saturated range of x<−x0. If an output y produced when an input x=Xsin(ωt) is applied is represented by y=Ysin(ωt+θ), then a describing function of the saturation element 48 is expressed as follows:

If α=X/x0≦1, then the gain of the saturation element 48 is Y/X=1 and the phase shift θ thereof is θ=0.

If α=X/x0>1, then the gain of the saturation element 48 is Y/X=k(α) and the phase shift θ thereof is θ=0 where $$k(\alpha) = \frac{2}{\pi}\left\{\sin^{-1}\frac{1}{\alpha} + \frac{1}{\alpha}\sqrt{1-\left(\frac{1}{\alpha}\right)^2}\right\} \quad (3)$$

Figure 8:
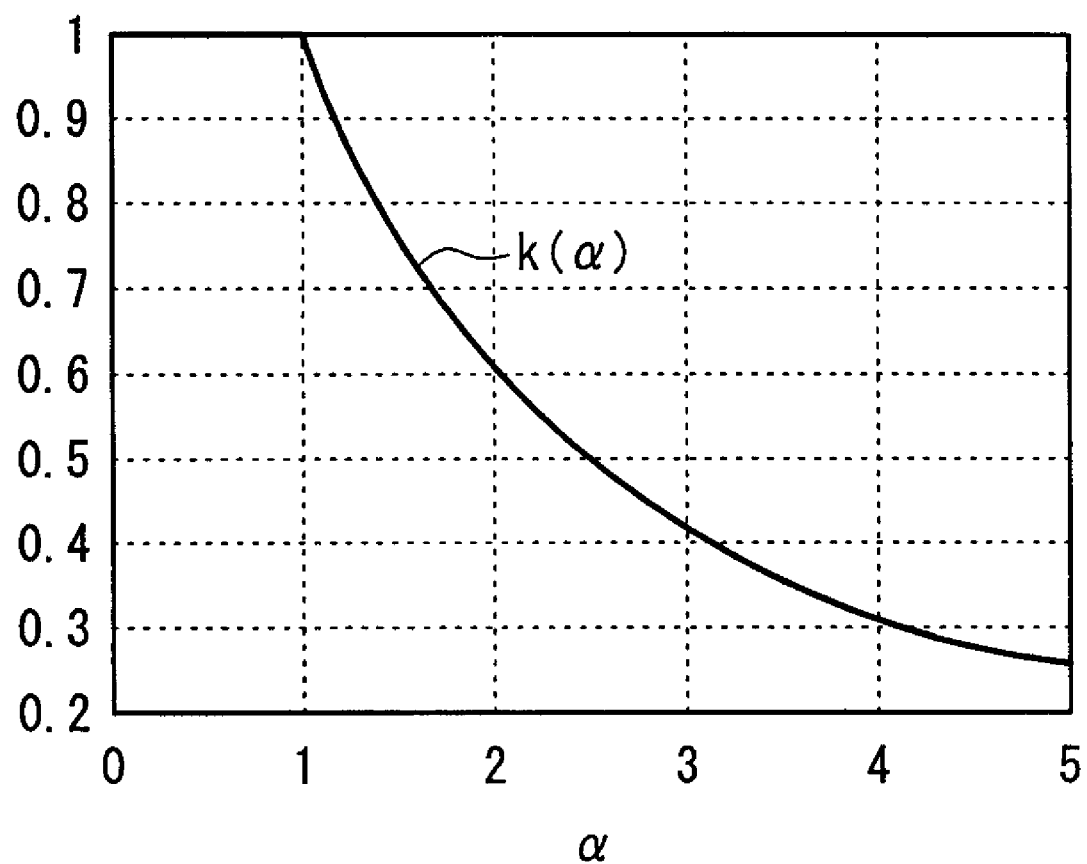
FIG. 8 is a diagram showing gain characteristics of the saturated positive-feedback filter.

As shown in FIG. 8, as the input amplitude increases, α increases. If α≦1, then Y/X=1. As α increases further, k(α) decreases in inverse proportion. If the input amplitude of the saturation element 48 becomes greater than the saturated value (x0), then the equivalent gain of the saturation element 48 becomes smaller than 1. In this case, the frequency characteristics of the saturated positive-feedback filter 110 (see FIG. 7) are presumed to be similar to those obtained when ka in the positive-feedback filter 100 (see FIG. 4) is smaller than 1. In other words, integral characteristics are restrained.

FIGS. 9 through 16 show simulated cosine inputs, in the event that the output of the saturated positive-feedback filter 110 is represented by y1 and the output of the positive-feedback filter 110 is represented by y2. In these simulations, the neutral point gain of the saturation element 48 of the saturated positive-feedback filter 110 is 1, and the saturated value (x0) is 0.5. FIGS. 9 through 12 show responses to a low frequency (0.2×π(rad/s)), whereas FIGS. 13 through 16 show responses to a high frequency (2×π(rad/s)). The maximum input amplitude X is X=0.31 in FIG. 9, X=0.35 in FIG. 10, X=0.5 in FIG. 11, X=1.0 in FIG. 12, X=2.35 in FIG. 13, X=2.8 in FIG. 14, X=3.5 in FIG. 15, and X=5.0 in FIG. 16. In FIGS. 9 through 16, the left vertical axis represents graduations for the outputs y1, y2. For the sake of brevity, graduations for the input X have been omitted from illustration.

At the frequency ω=0.1 Hz (0.2×π(rad/s)) (FIGS. 9 and 10), the cosine input amplitude X is equal to or smaller than about 0.1π and the input of the saturation element 48 is equal to or smaller than a saturated value of 0.5, with the output y1 and the output y2 being equal to each other.

At the frequency ω=0.1 Hz (0.2×π(rad/s)), the maximum amplitude Ya of the output y1 of the positive-feedback filter 100 for the cosine input X=0.1π is determined as Ya=0.5015 in accordance with the above equation (2).

Figure 9:
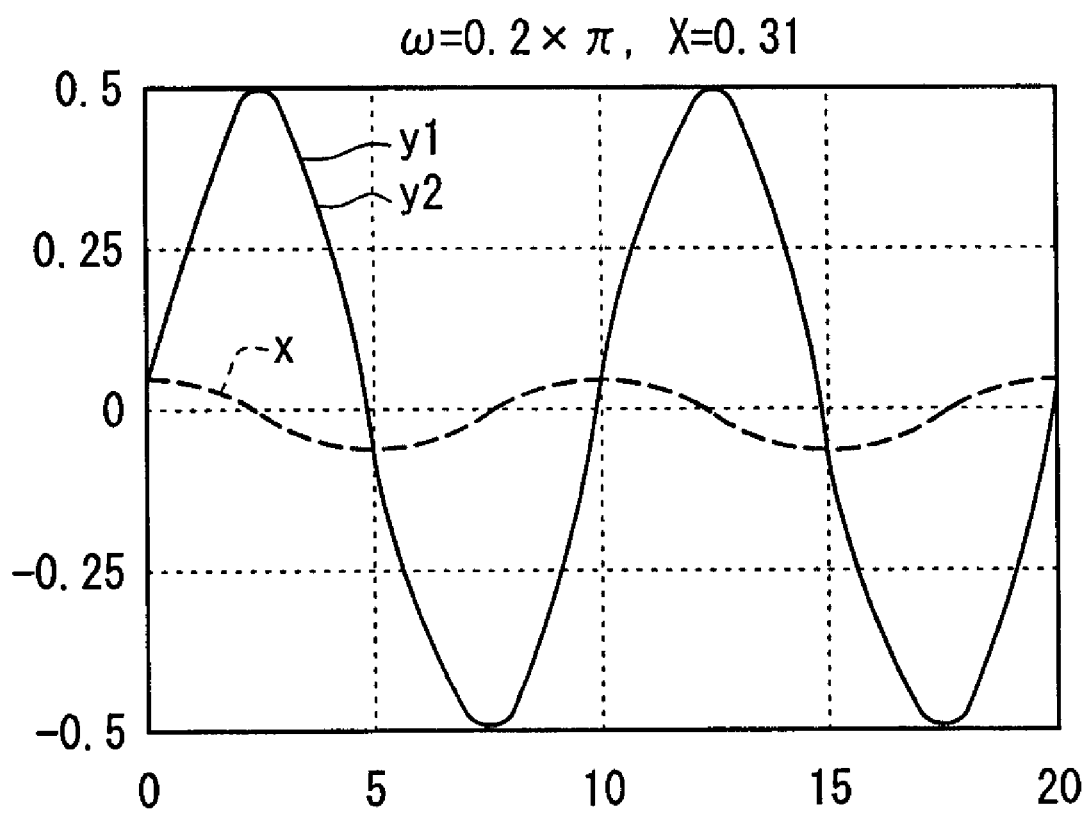
FIG. 9 is a diagram showing simulated outputs of the positive-feedback filter and the saturated positive-feedback filter at the time an input amplitude X is 0.31 at a low frequency.
Figure 10:
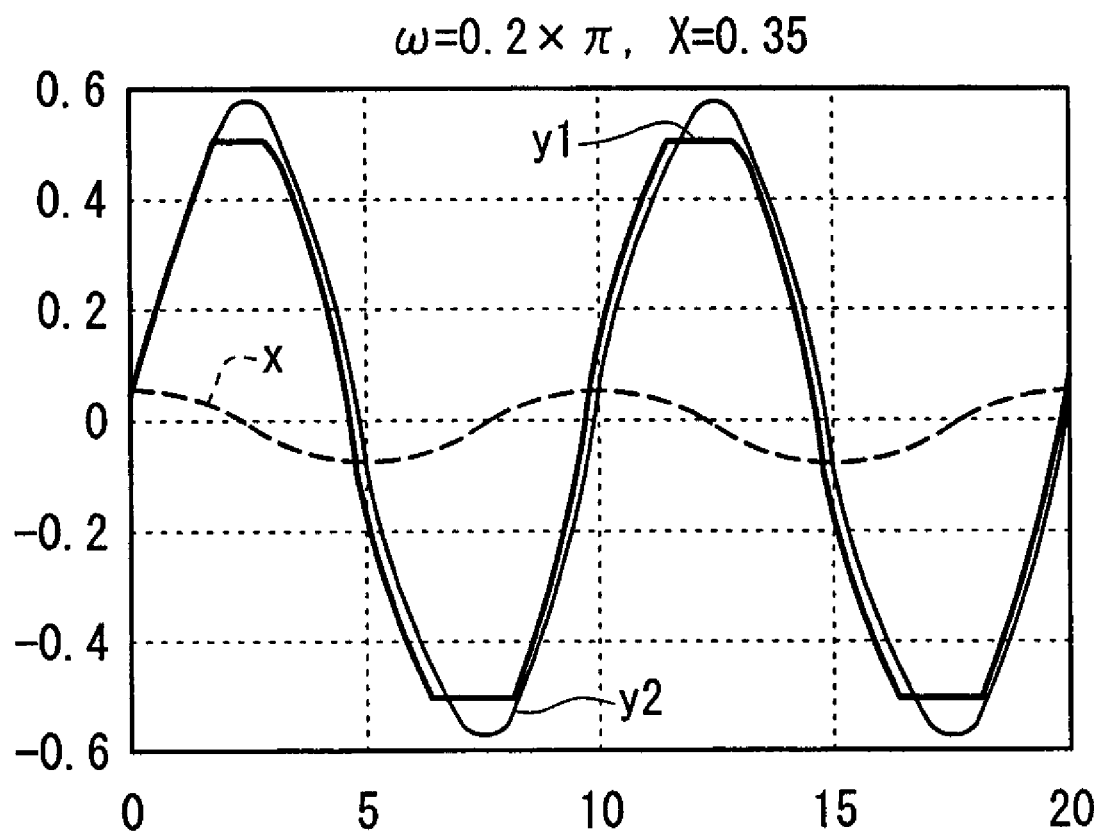
FIG. 10 is a diagram showing simulated outputs of the positive-feedback filter and the saturated positive-feedback filter at the time an input amplitude X is 0.35 at a low frequency.
Figure 11:
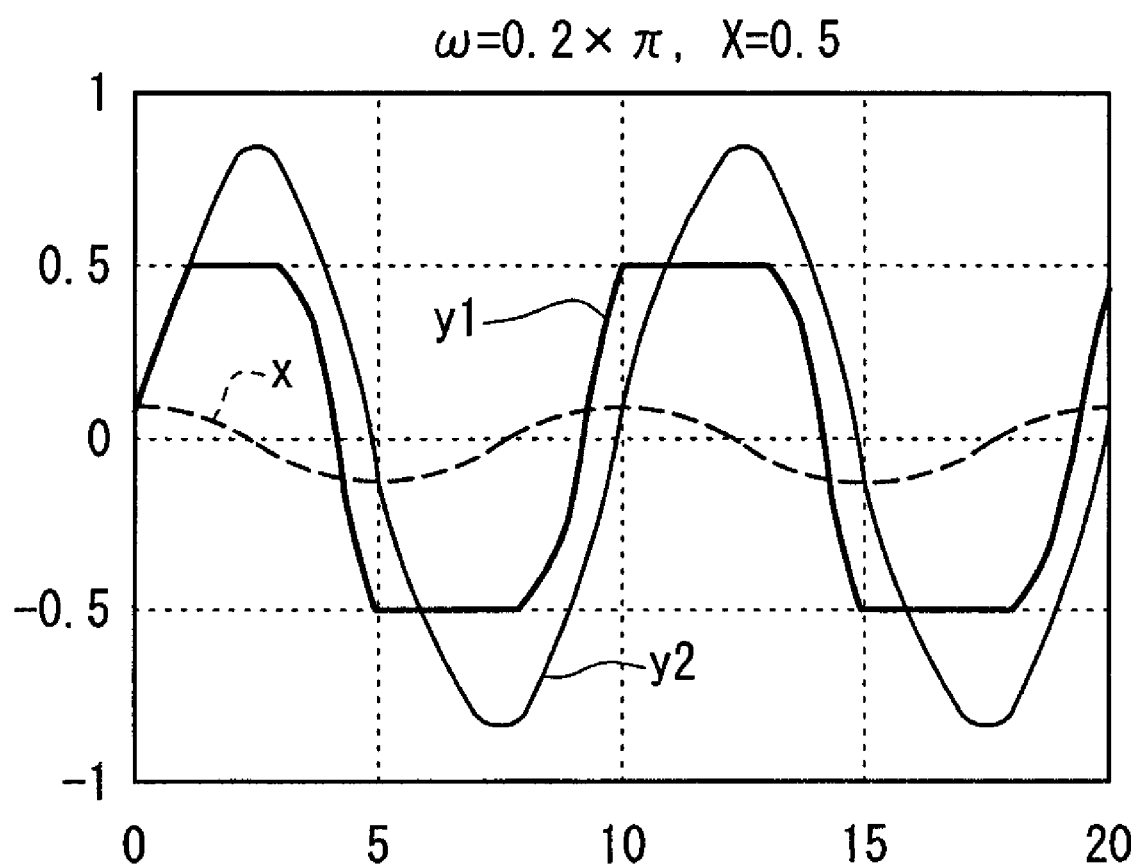
FIG. 11 is a diagram showing simulated outputs of the positive-feedback filter and the saturated positive-feedback filter at the time an input amplitude X is 0.5 at a low frequency.
Figure 12:
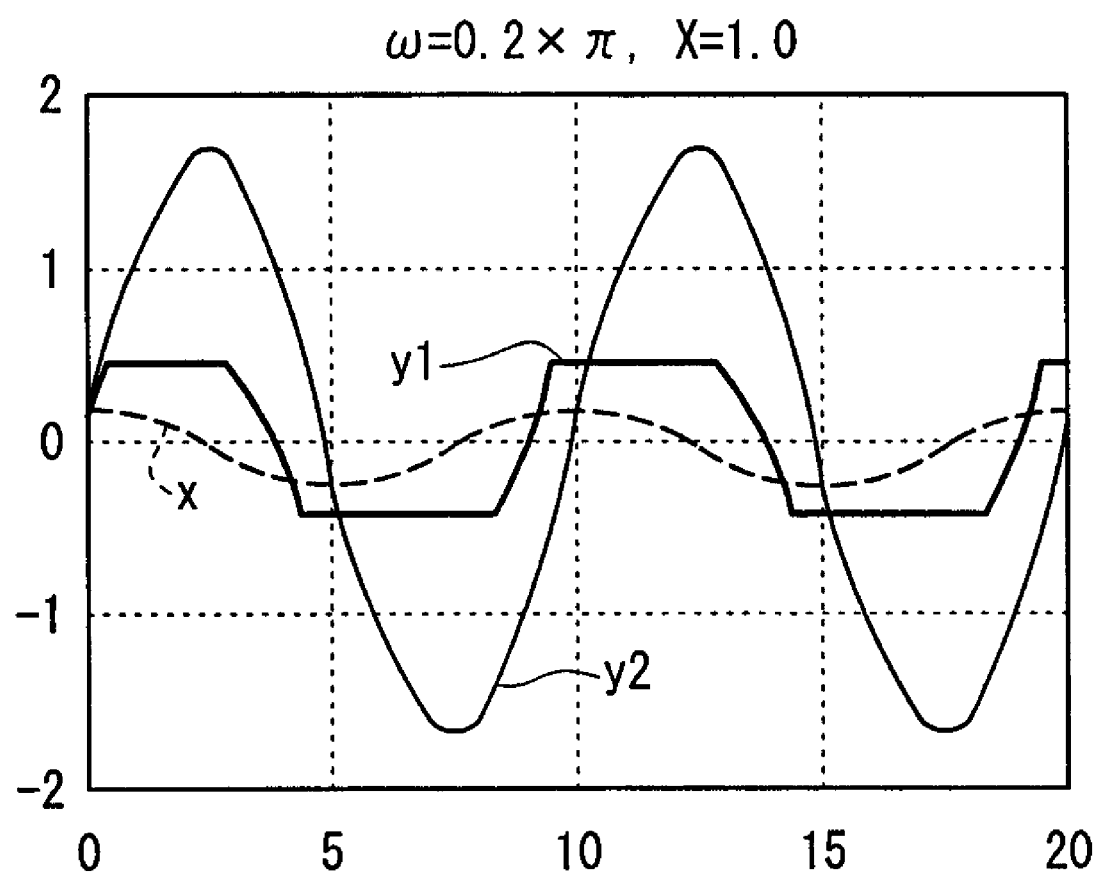
FIG. 12 is a diagram showing simulated outputs of the positive-feedback filter and the saturated positive-feedback filter at the time an input amplitude X is 1.0 at a low frequency.
Figure 13:
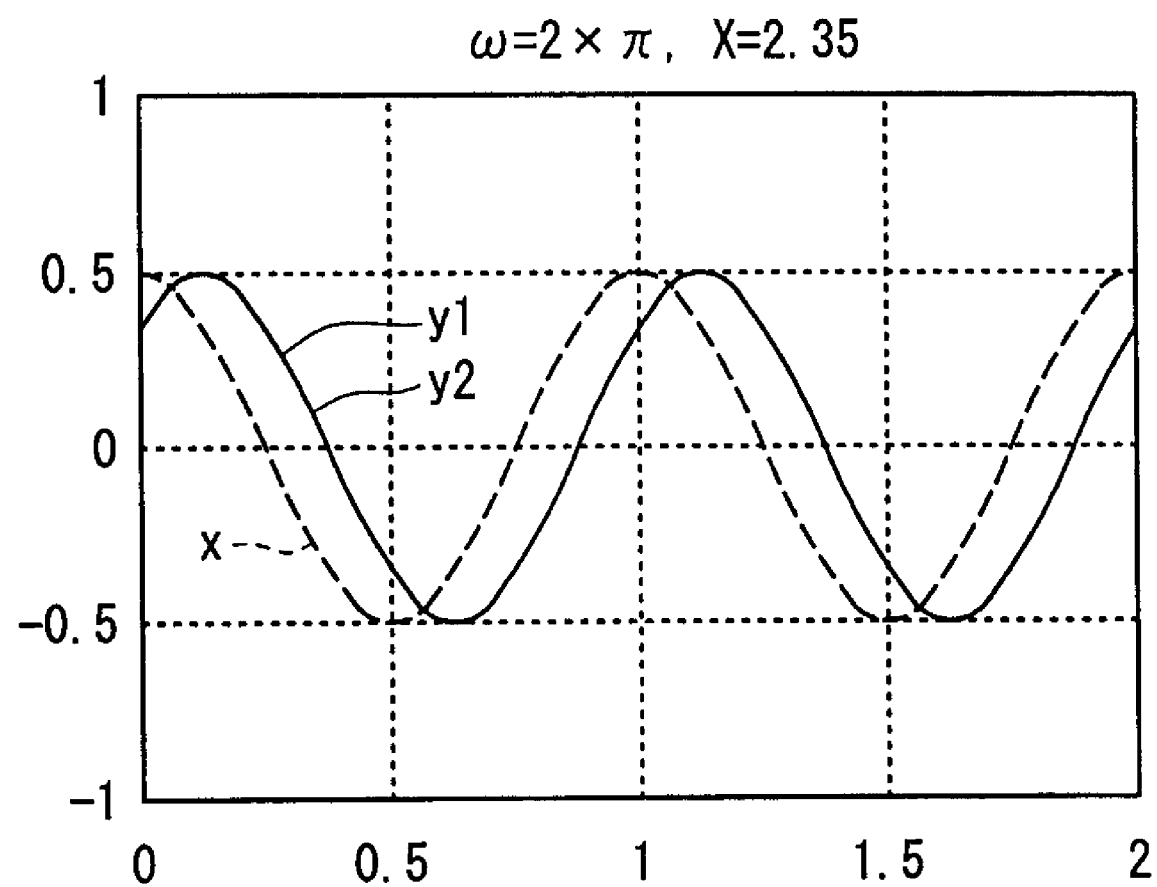
FIG. 13 is a diagram showing simulated outputs of the positive-feedback filter and the saturated positive-feedback filter at the time an input amplitude X is 2.35 at a low frequency.
Figure 14:
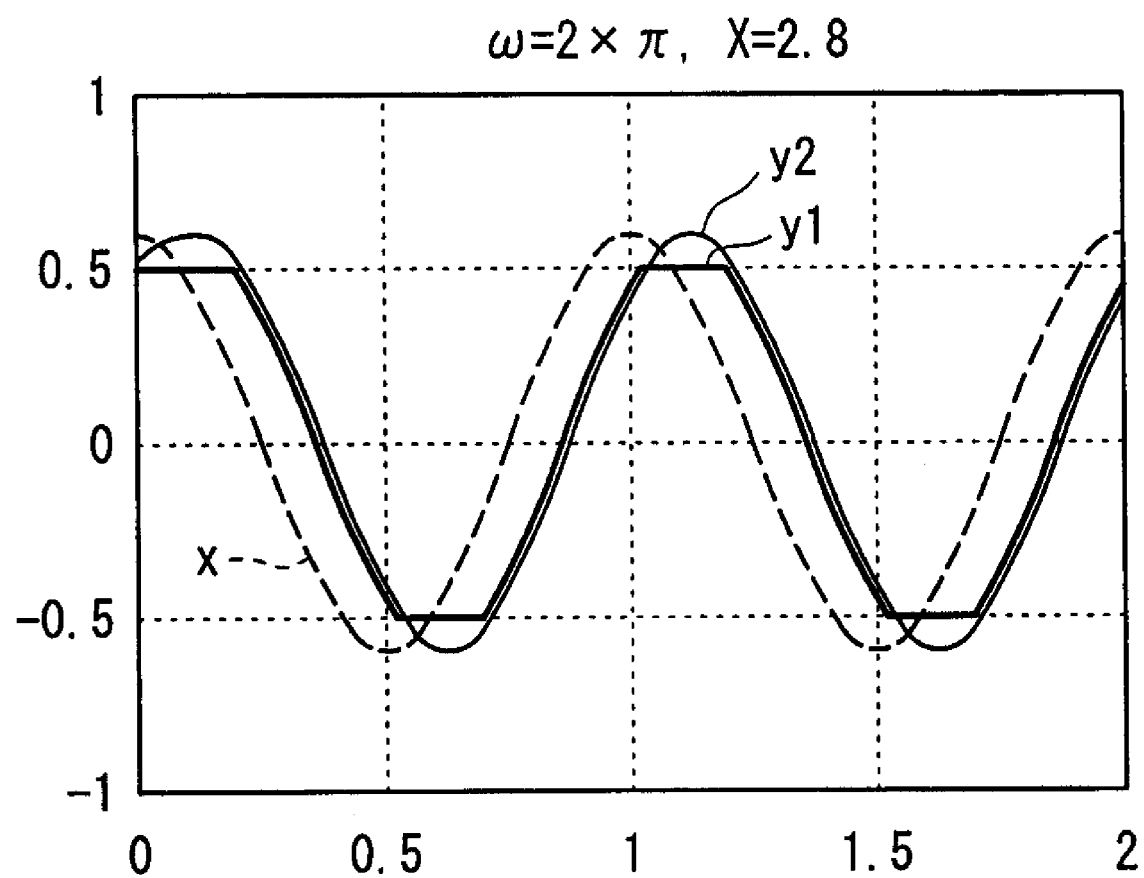
FIG. 14 is a diagram showing simulated outputs of the positive-feedback filter and the saturated positive-feedback filter at the time an input amplitude X is 2.8 at a low frequency.

As can be seen from FIGS. 9 and 13, if no saturation occurs, the output y1 of the saturated positive-feedback filter 110 and the output y2 of the positive-feedback filter 100 are equal to each other. If saturation occurs, the response of the output y1 for a low-frequency input is ahead in phase of the output y2 having integral characteristics, and the amplitude is limited by the saturated value of 0.5.

For a high-frequency input, as can be seen from the frequency characteristics shown in FIGS. 5 and 6, the output y1 and the output y2 have similar forms, except that the amplitude of the output y1 is limited by the saturated value.

From the above results, it has been confirmed that if the input amplitude is equal to or smaller than the saturated value, then the low-frequency gain of the saturated positive-feedback filter 110 has characteristics similar to the integration element (1/s). Further, in a range in which the input amplitude exceeds the saturated value, the output amplitude is limited and integral characteristics are restrained, resulting in a leading phase.

3) Integrator Windup Suppression by the Saturated Positive-Feedback Filter 110:

As described above, if saturation occurs with respect to the integrator, integration windup is caused. If the saturated positive-feedback filter 110 is used instead of an ordinary integrator (1/s), then it functions as an integrator within a small-deviation range, and can restrain integral characteristics for large deviations, which would otherwise cause integrator windup, thereby suppressing integrator windup. An application of the saturated positive-feedback filter 110 to servo system PID control, for example, shall be described below.

Figure 17:
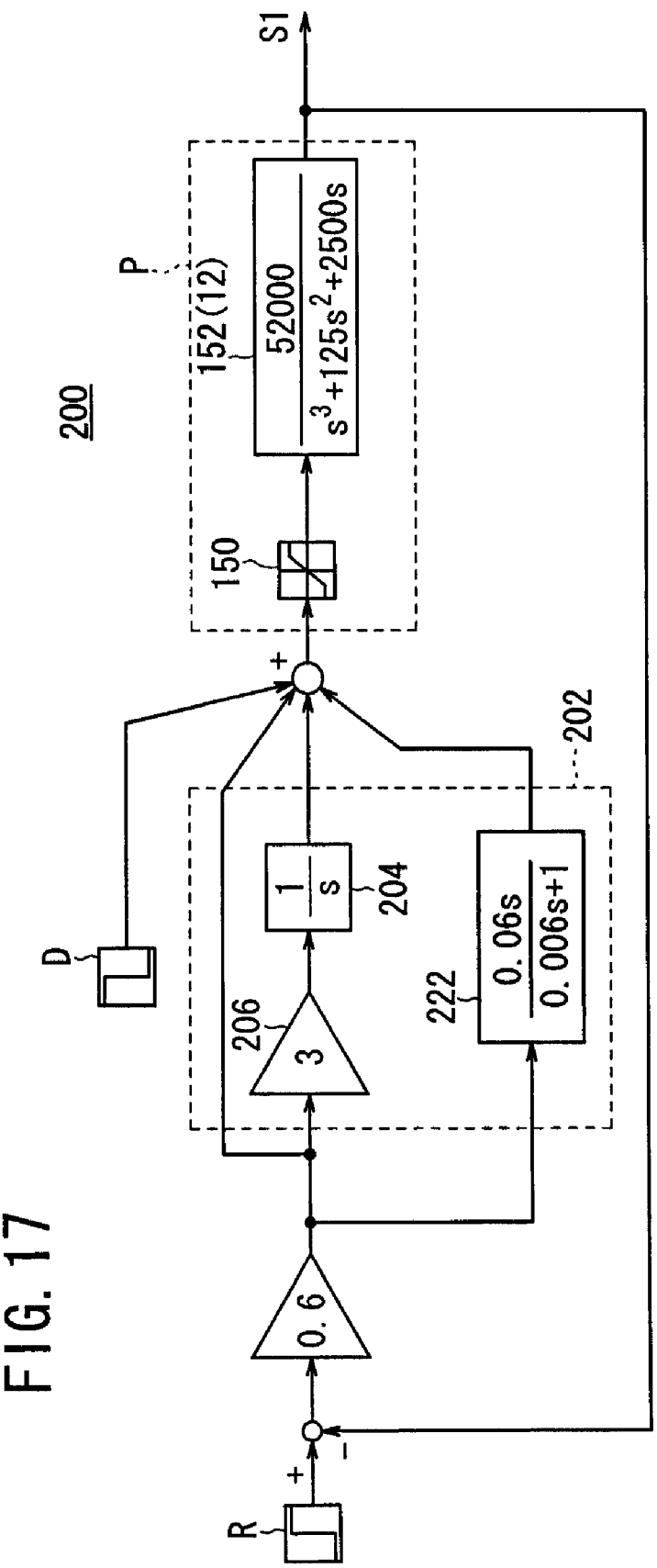
FIG. 17 is a block diagram of a positioning system employing a PID controller.
Figure 18:
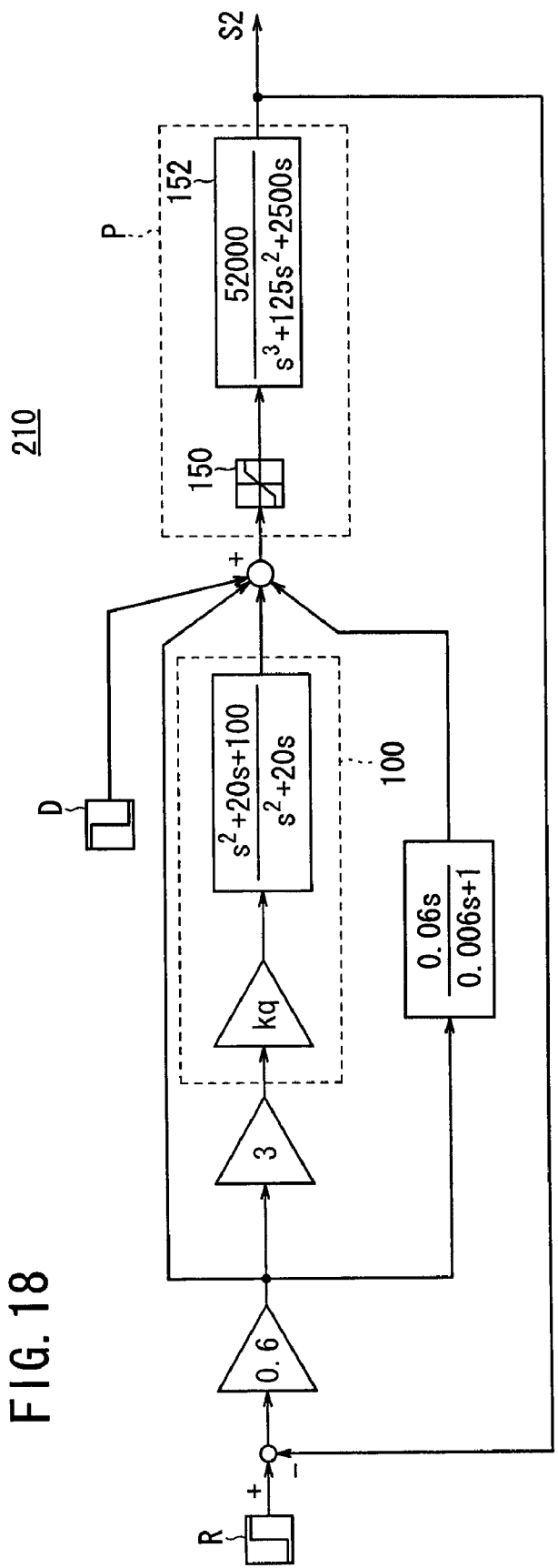
FIG. 18 is a block diagram of a positioning system similar to the control system shown in FIG. 17, except that a positive-feedback filter is used instead of the integrator that is used in the control system shown in FIG. 17.
Figure 19:
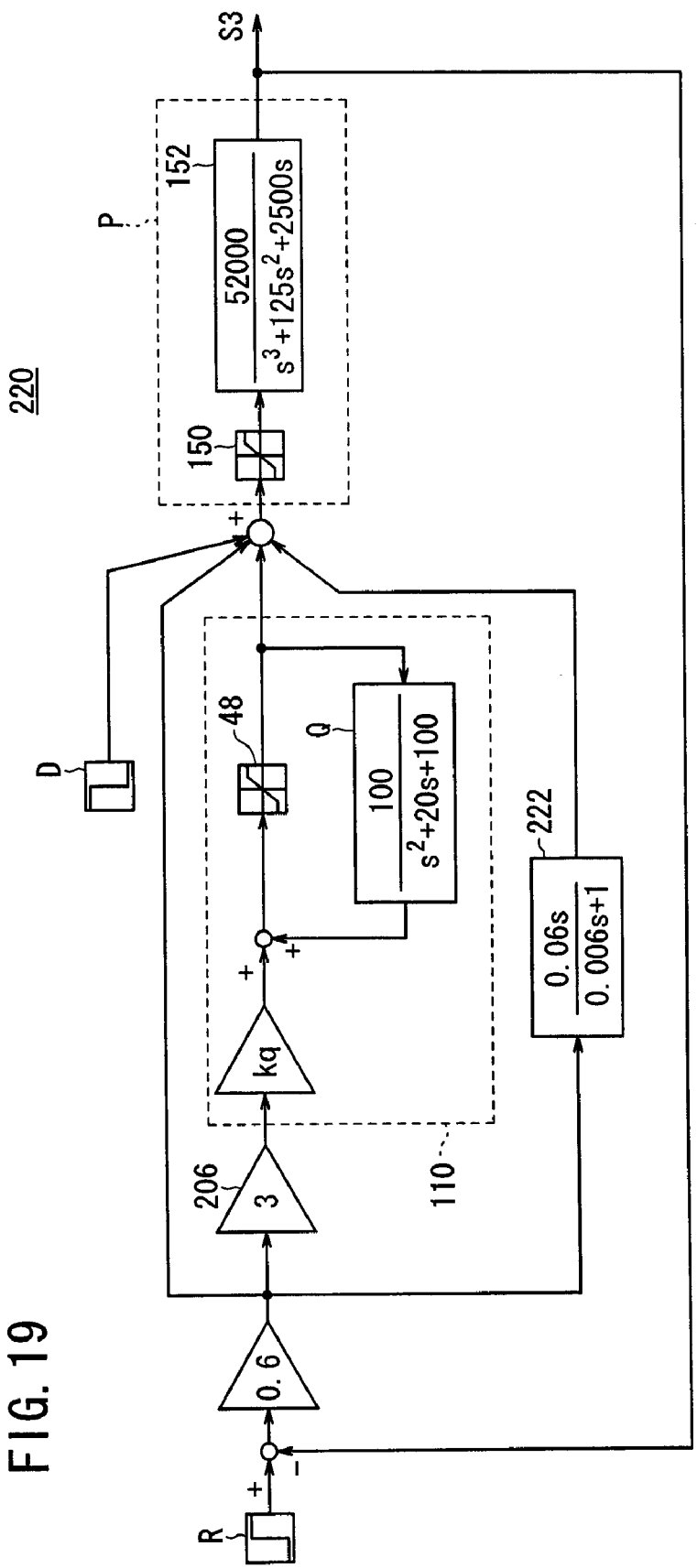
FIG. 19 is a block diagram of a positioning system similar to the control system shown in FIG. 17, except that a saturated positive-feedback filter is used instead of the integrator that is used in the control system shown in FIG. 17.

FIG. 17 shows a first system model 200, which is a positioning system employing a PID controller 202. FIG. 18 shows a second system model 210, which is a positioning system employing the positive-feedback filter 100 in place of the integrator 204 of the first system model 200. FIG. 19 shows a third system model 220, which is a positioning system employing the saturated positive-feedback filter 110 in place of the integrator 204 of the first system model 200. It is assumed that a control valve 150, which corresponds to the proportional valve 40, has a saturation of ±0.2. In FIGS. 17 through 19, the reference numeral 152 represents a model of the cylinder 12.

It is assumed that the command value R is a step input having a magnitude of 1, and the disturbance D is a step input having a magnitude of 0.5, which is generated at a time td later than the command value R. The PID controller 202 has a proportional element 206 of "3", a differential element 208 of "0.06 s/(0.006 s+1)", and a proportional element Kp of "0.6". The cylinder 12 has a transfer function of 52000/(s³+125 s²+2500 s), and the saturation element 48 has a saturated value of ±0.6. For the sake of brevity, the speed feedback loop 44, the element 60, and the saturated value changer 50 in the positioning control system 10 (see FIG. 3) have been omitted from illustration in FIGS. 17 through 19.

Figure 20:
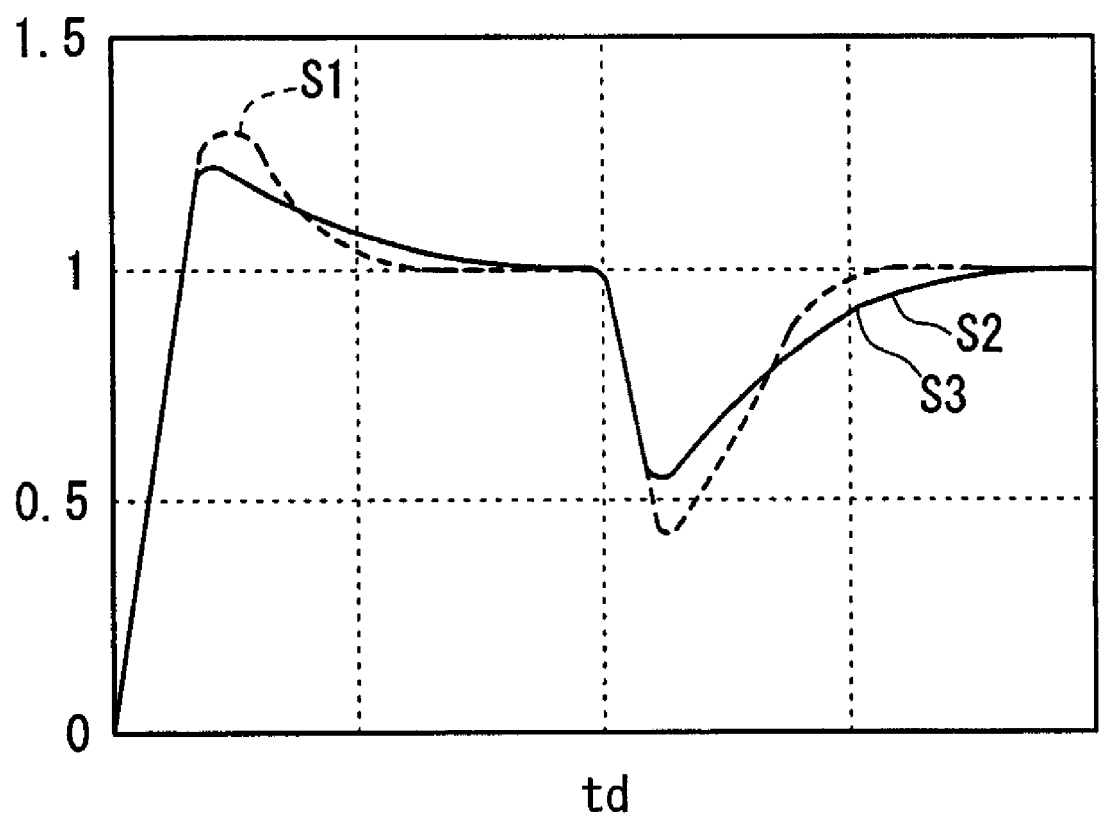
FIG. 20 is a diagram showing simulated outputs at the time a saturation element is not saturated in the positioning systems shown in FIGS. 17 and 18.
Figure 21:
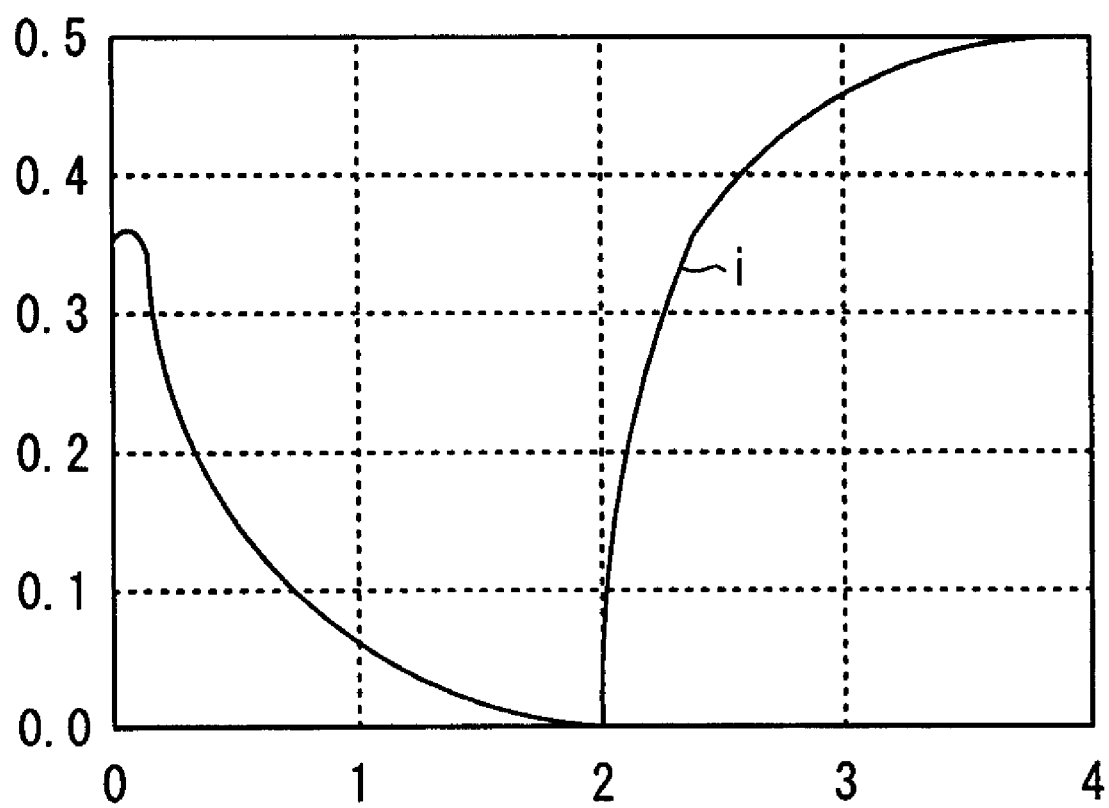
FIG. 21 is a diagram showing a simulated input signal of the saturation element, which produces the simulated outputs shown in FIG. 20 at the time the saturation element is not saturated.

Simulated outputs S1, S2, S3 of the respective first, second, and third system models 200, 210, 220 when kq=0.2 are shown in FIG. 20. As shown in FIG. 21, the input i of the saturation element 48 of the third system model 220 does not exceed the saturated range of ±0.6. Therefore, the outputs S2 and S3 are equal to each other.

Figure 22:
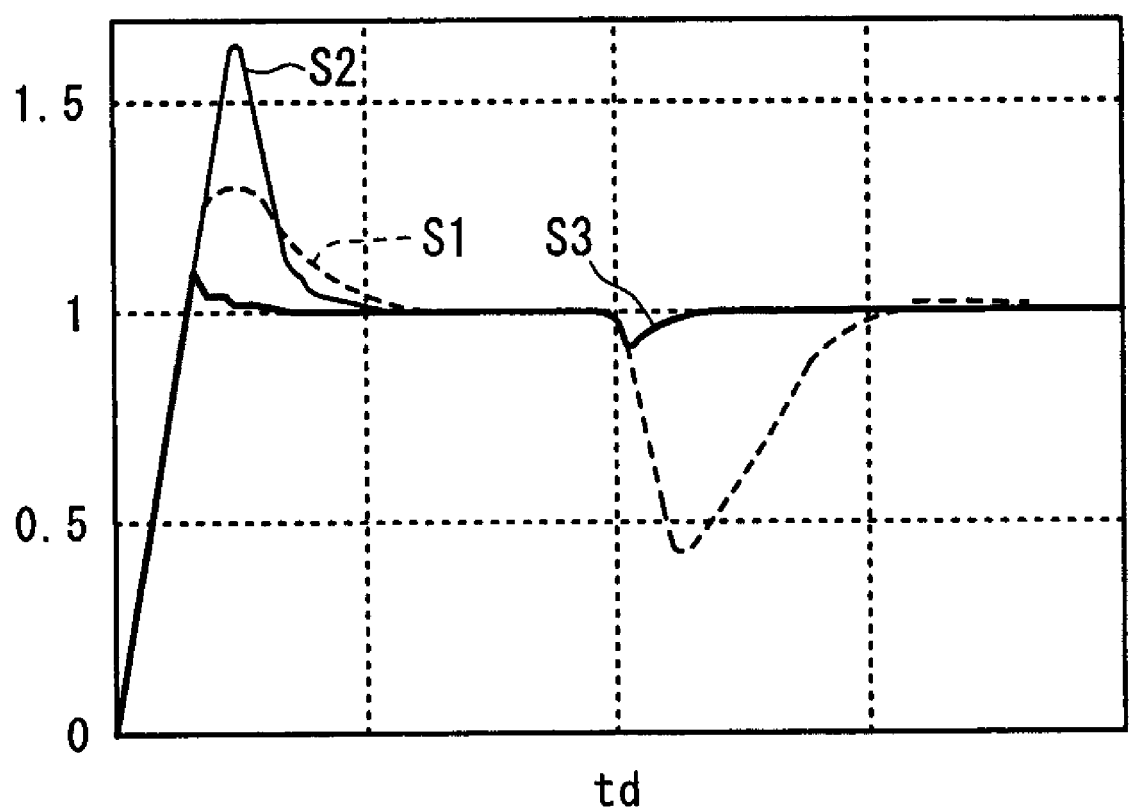
FIG. 22 is a diagram showing simulated outputs at the time a saturation element is saturated in the positioning systems shown in FIGS. 17 and 18.
Figure 23:
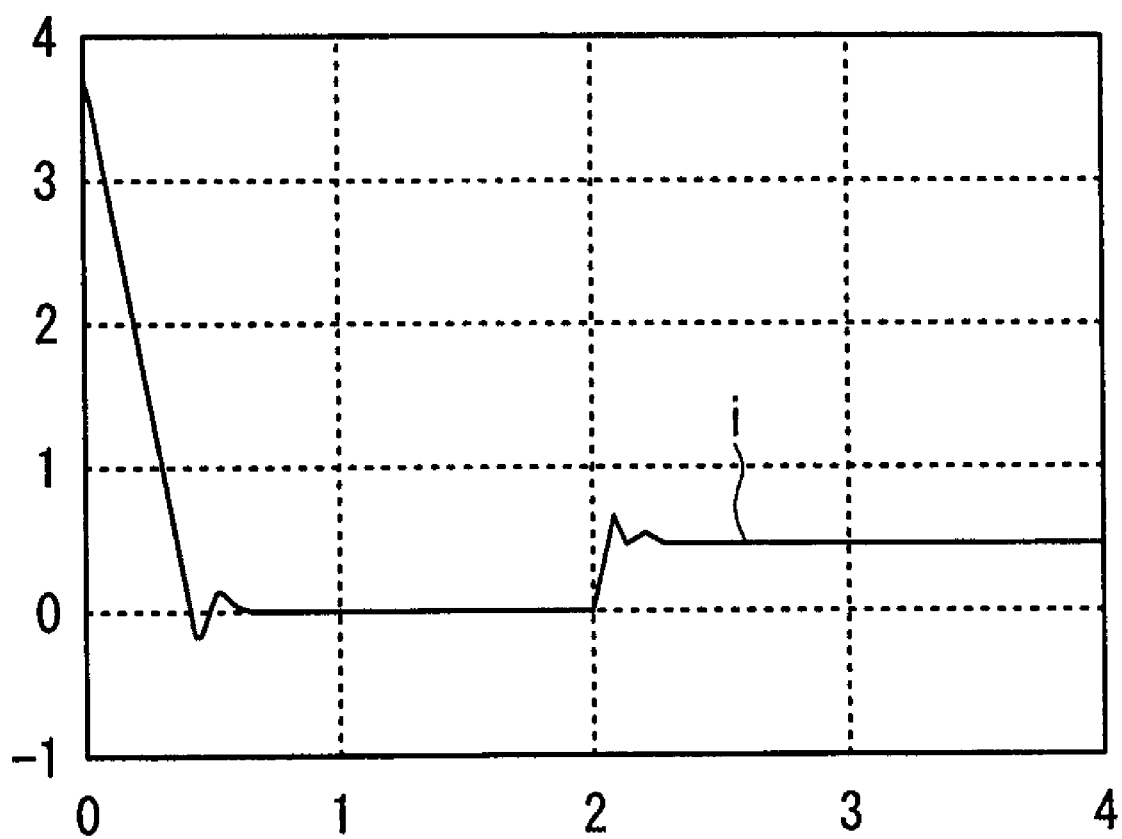
FIG. 23 is a diagram showing a simulated input signal of the saturation element, which produces the simulated outputs shown in FIG. 20 at the time the saturation element is saturated.

Simulated outputs S1, S2, S3 of the respective first, second, and third system models 200, 210, 220 when kq=2.0 are shown in FIG. 22. It can be observed from FIG. 22 that integrator windup for the step input is large in the output S2, and is restrained in the output S3. Responses to the disturbance D after time td are not different from each other. Reasons for such responses are as follows: As shown in FIG. 23, the input i of the saturation element 48 of the third system model 220 has reached the saturated range (equal or higher than 0.6) of the saturation element 48 upon a response to the step input, so that the third system model 220 functions to restrain integrator windup. Upon a response to the disturbance D after time td, since the input i of the saturation element 48 has not reached the saturated range of 0.6, the outputs S2 and S3 are equal to each other. Naturally, the responses are different from each other depending on the saturated value and the magnitude of the disturbance.

Figure 24:
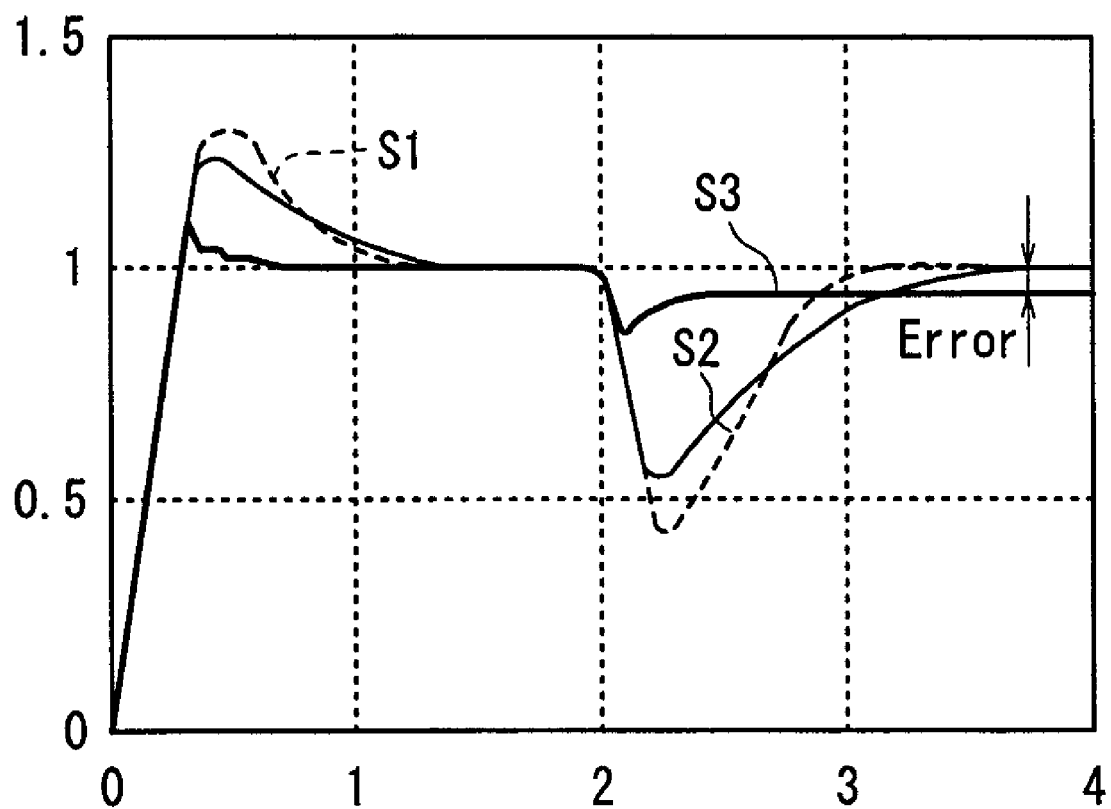
FIG. 24 is a diagram showing simulated outputs at the time a saturation element is saturated in the positioning systems shown in FIGS. 17 and 18, wherein the saturated value of the saturation element is smaller than a disturbance.
Figure 25:
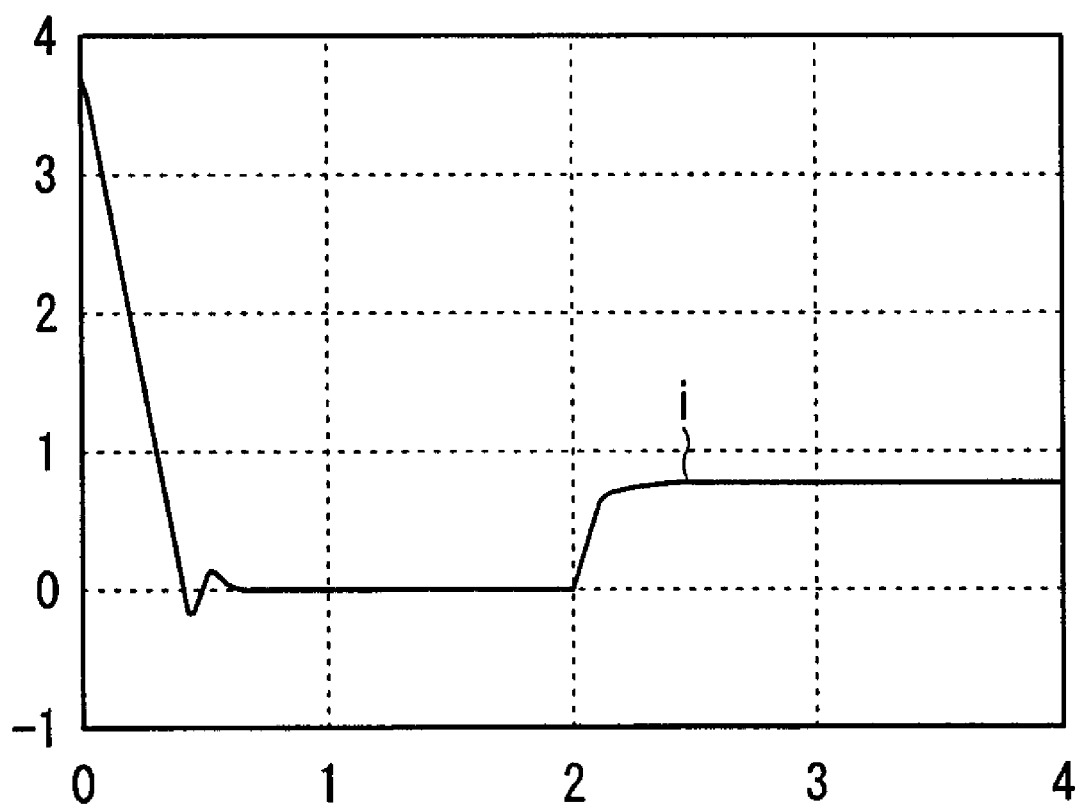
FIG. 25 is a diagram showing a simulated input signal of the saturation element, which produces the simulated outputs shown in FIG. 24 at the time the saturation element is saturated.

Simulated outputs S1, S2, S3 of the respective first, second, and third system models 200, 210, 220, when kq=0.2 in the second system model 210, kq=2.0 in the third system model 220, and the saturated value of the saturation element is ±0.45, are shown in FIG. 24. Responses to the step input are the same as those in FIGS. 20 and 22, but responses to the disturbance D are different from each other.

Figure 15:
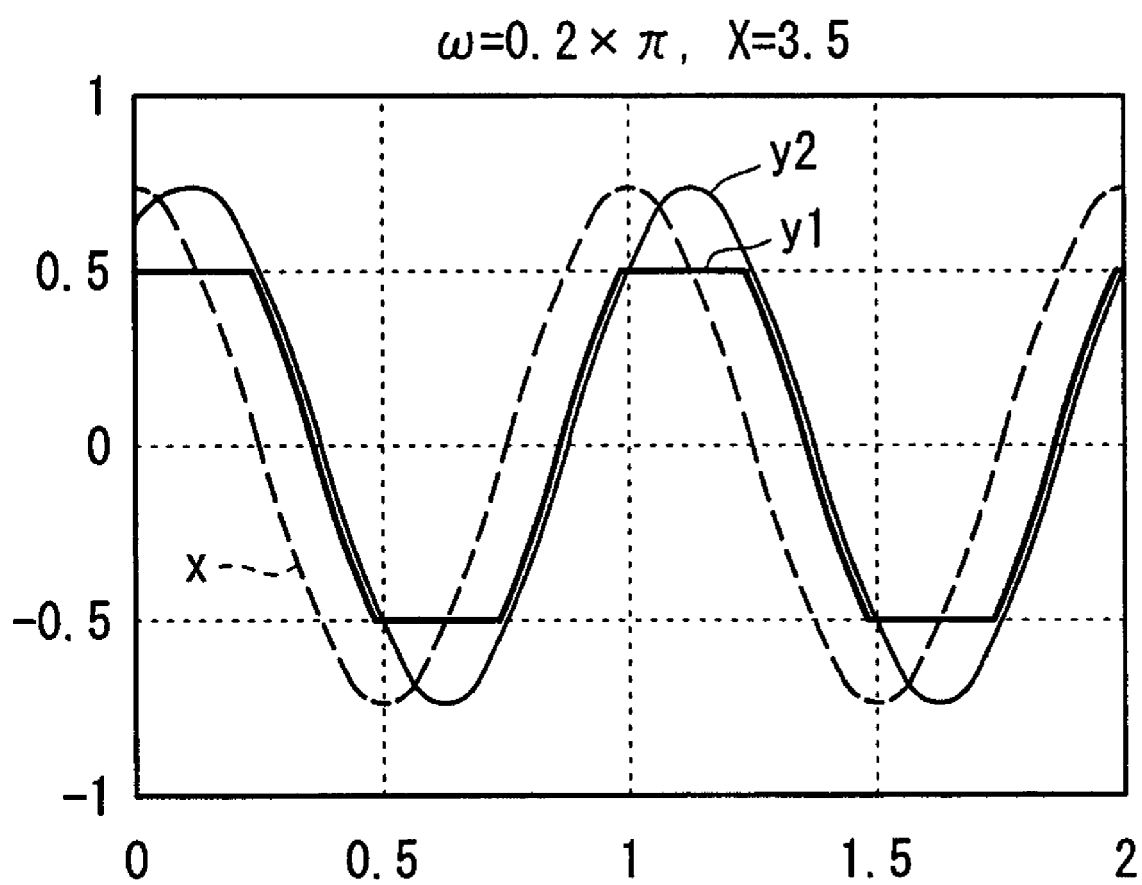
FIG. 15 is a diagram showing simulated outputs of the positive-feedback filter and the saturated positive-feedback filter at the time an input amplitude X is 3.5 at a low frequency.
Figure 16:
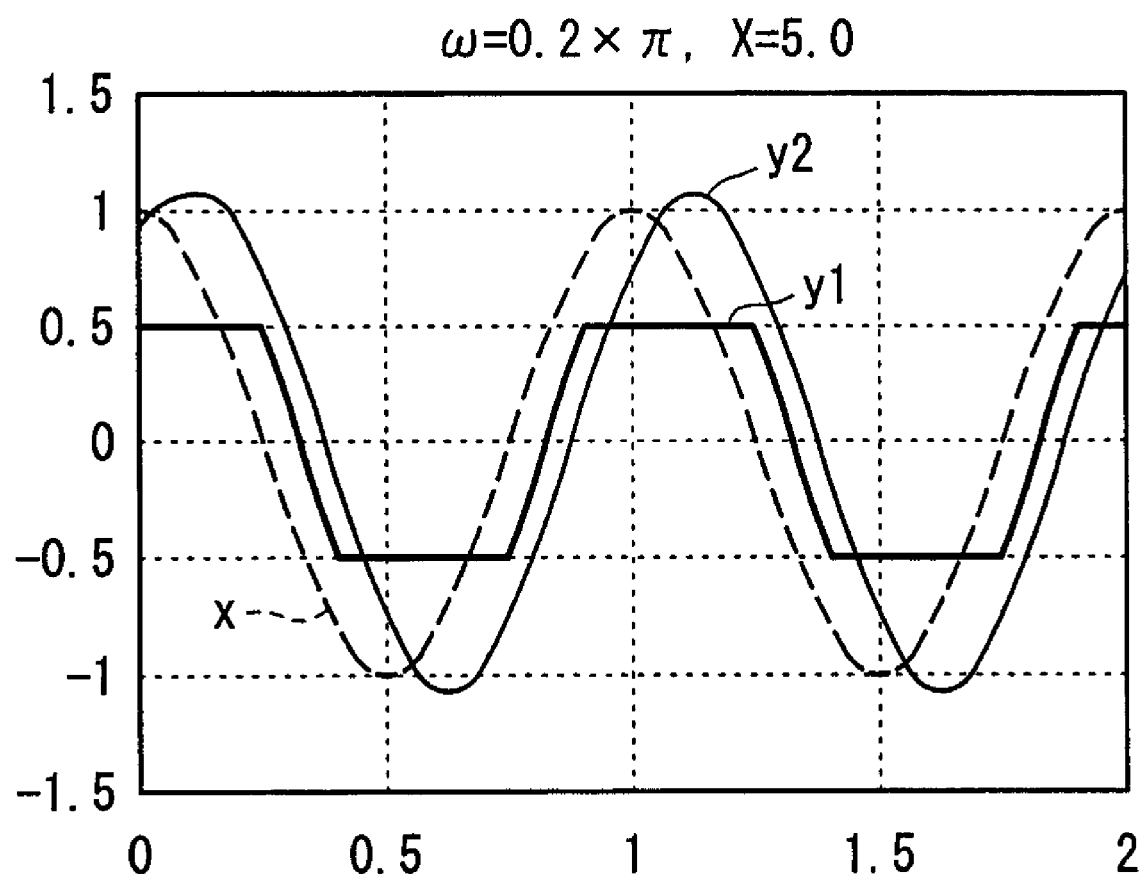
FIG. 16 is a diagram showing simulated outputs of the positive-feedback filter and the saturated positive-feedback filter at the time an input amplitude X is 5.0 at a low frequency.

The outputs S1 and S2 have a steady-state deviation of 0 with respect to the disturbance D due to the integral characteristics in a low-frequency range. However, the output S3 of the third system model 220 suffers a steady-state deviation of Ea. This is because the input i of the saturated positive-feedback filter 110 exceeds the saturated value of "0.6" upon response to the disturbance D, as shown in FIG. 15, and is caused by the restrained integral characteristics in the low-frequency range of the saturated positive-feedback filter 110.

Generally, if a plant with integral characteristics has a constant output value in a steady state, then the input of the plant has to be nil. Since the output of a differentiator 222 of the third system model 220 is nil, the output of the saturated positive-feedback filter 110 is 0.45, and the step quantity of the disturbance D is −0.5, the output of the proportional element 206 must be 0.05 (see FIG. 19).

Therefore, a steady-state deviation with respect to the disturbance D remains with an Error=0.05/0.6=0.08333. Based on these simulated results, a trade-off to be described below is taken into consideration when setting a threshold value for the saturated positive-feedback filter 110. To give priority to suppression of integrator windup due to saturation of the plant input and the integral element, the saturated value of the saturation element 48 in the saturated positive-feedback filter 110 is set to a low level, so as to cause the saturation element 48 to be saturated. In order to make the steady-state deviation with respect to the disturbance D nil or as small as possible, the saturated value is set to a sufficiently large level. Consequently, the saturated value may be set taking into consideration a balance between the suppression of integrator windup and minimization of the steady-state deviation, depending on the design conditions.

Figure 26:
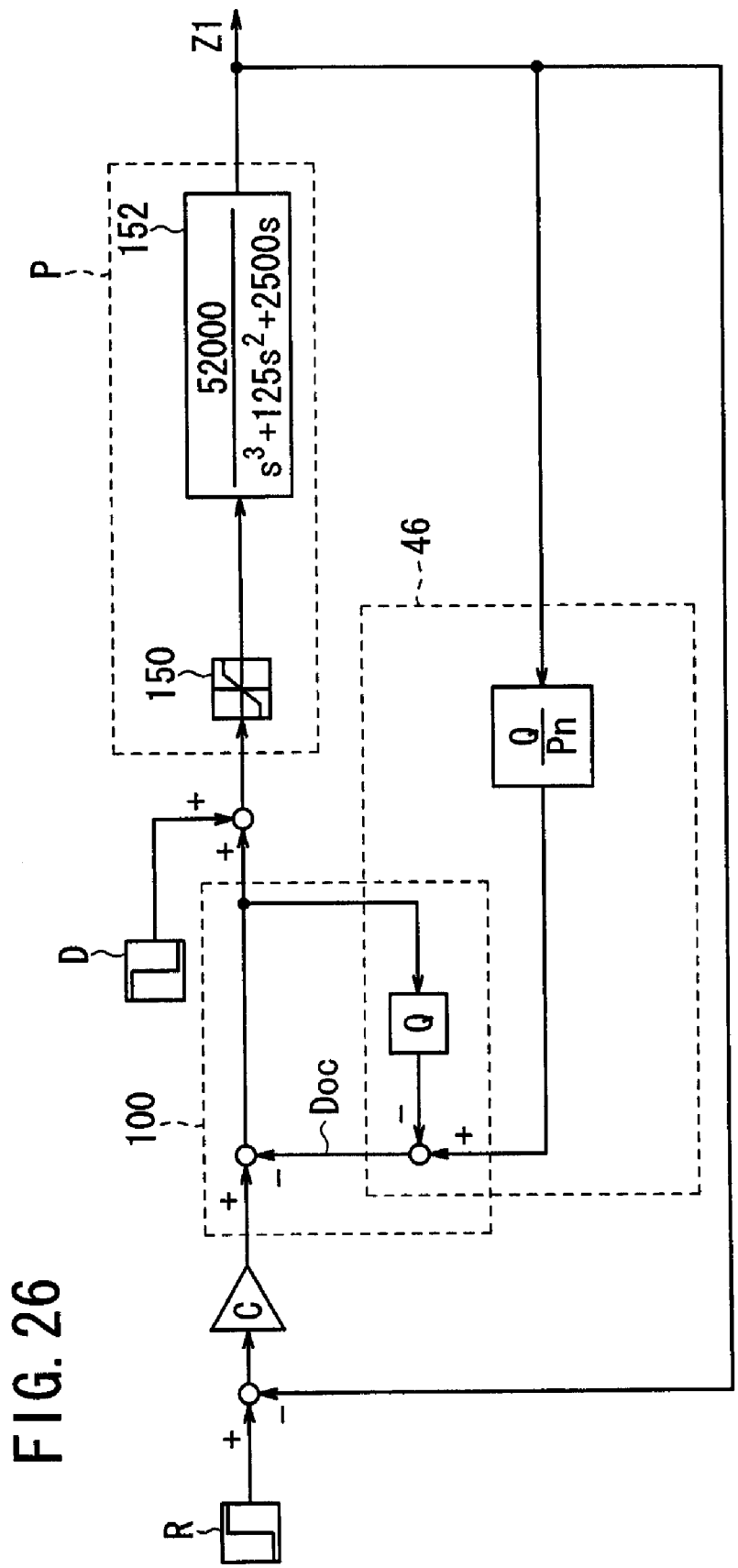
FIG. 26 is a block diagram of a system wherein a saturated positive-feedback filter is not incorporated in a disturbance observer.
Figure 27:
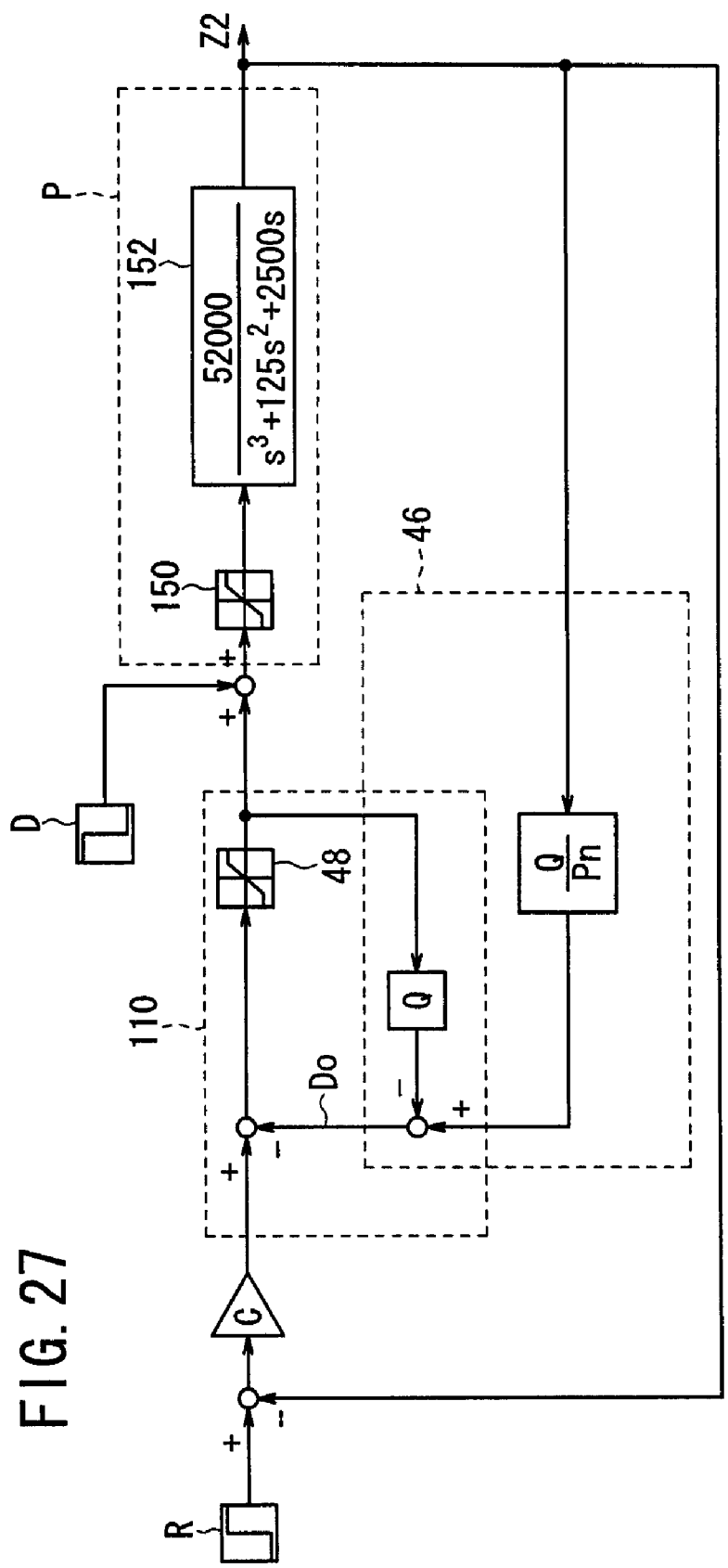
FIG. 27 is a block diagram of a system wherein a saturated positive-feedback filter is incorporated in a disturbance observer.

4) The Effect of the Saturated Positive-Feedback Filter 110 Applied to the Disturbance Observer:

The effect of the saturated positive-feedback filter 110 applied to the disturbance observer 46 shall be described below, based on simulations using two systems shown in FIGS. 26 and 27. FIG. 26 shows a system model 300 as a comparative example, and FIG. 27 shows a system model 310, which incorporates the saturated positive-feedback filter 110 in place of the positive-feedback filter 100 used in the system model 300. The system model 310 represents a model of the positioning control system 10 referred to above. In the system model 310, the saturation element 48 has a saturated value of ±0.6, the proportional valve 40 has a saturated value of ±0.2, the element Q has a value of $Q=100^3/(s+100)^3$, the cylinder 12 has a transfer function of $52000/(s^3+125 s^2+2500 s)$, and the element C has a gain of 1. For the sake of brevity, the speed feedback loop 44 and the compensating circuit for the saturation characteristics, and response improvement of the model of the proportional valve 40 in the nominal model (element 60), have been omitted from illustration. The output of the system model 300 is represented by z1, and the output of the system model 310 is represented by z2. It is assumed that the command value R is a step input having a magnitude of 1, whereas the disturbance D is a step input having a magnitude of 0.5, which is generated at a time td later than the command value R. In the system model 310, the element Q is shown as being divided into a portion corresponding to a pre-subtractor path 61 and the element 60 in FIG. 3. These divided components make up a circuit that is equivalent to the element Q.

Figure 28:
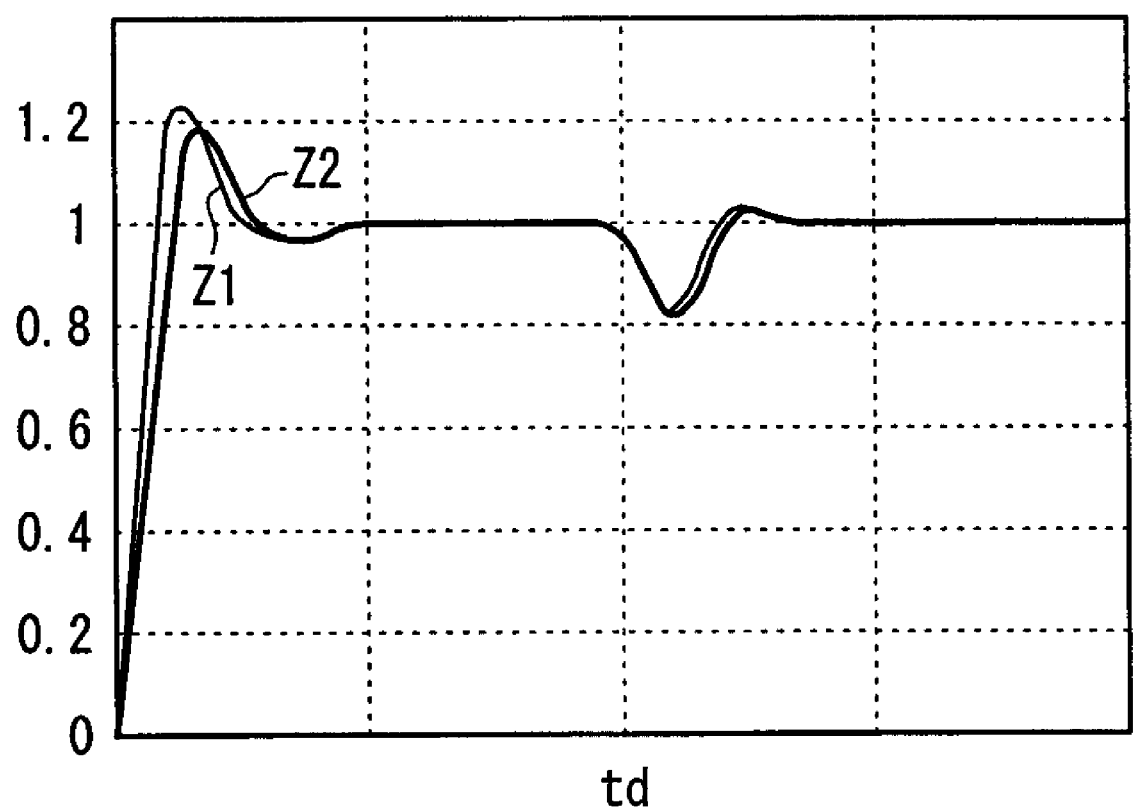
FIG. 28 is a diagram showing simulated outputs at the time a saturation element is not saturated in the systems shown in FIGS. 26 and 27.
Figure 29:
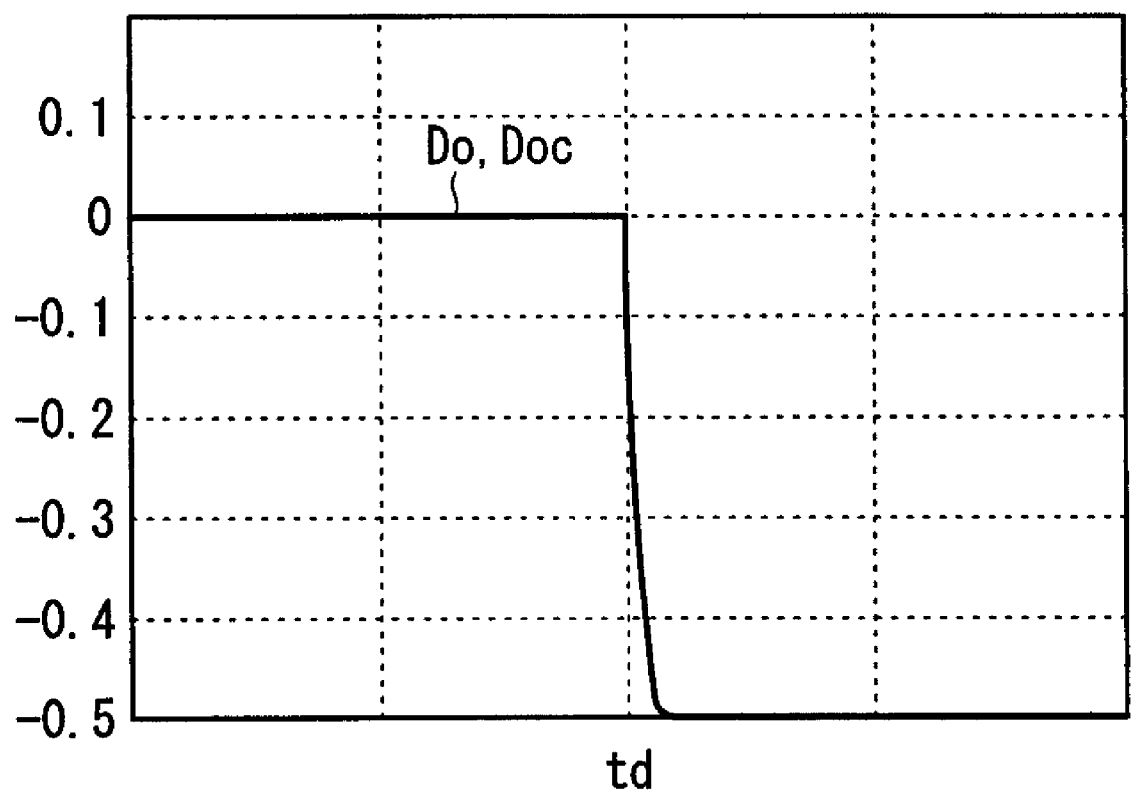
FIG. 29 is a diagram showing a simulated estimated disturbance value at the time a saturation element is not saturated in the systems shown in FIGS. 26 and 27.

As shown in FIG. 28, when the plant is not saturated, the outputs z1, z2 are substantially equal to each other. As shown in FIG. 29, estimated disturbance values Do, Doc of the system models 300, 310 and the disturbance D are substantially equal to each other. Therefore, it is confirmed that the disturbance D is properly estimated.

Figure 30:
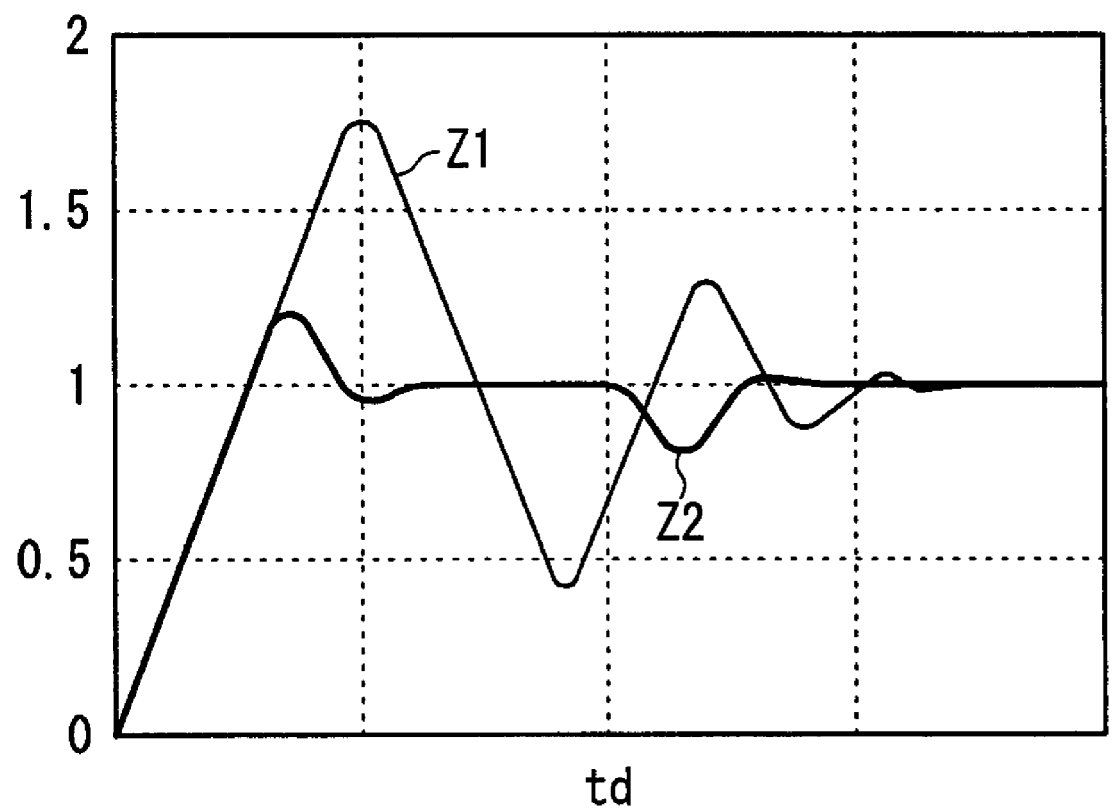
FIG. 30 is a diagram showing simulated outputs at the time a saturation element is saturated in the systems shown in FIGS. 26 and 27.
Figure 31:
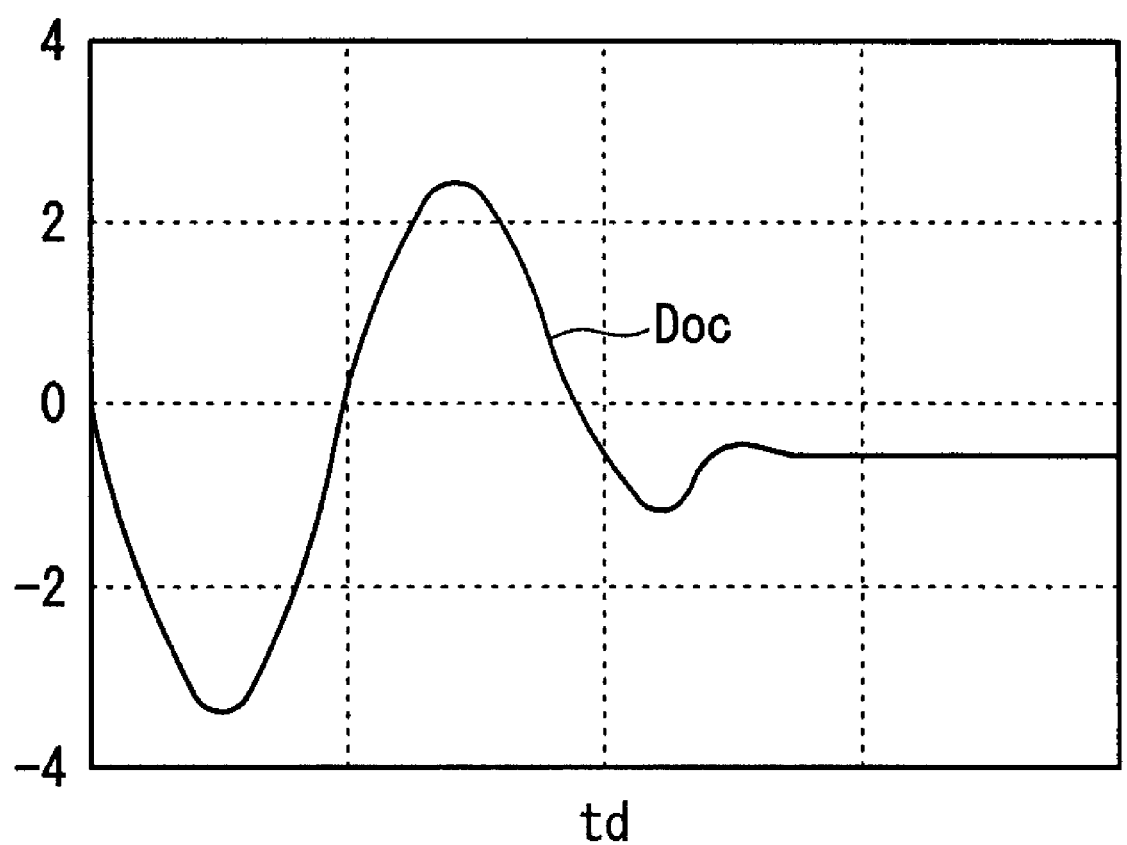
FIG. 31 is a diagram showing a simulated estimated disturbance value at the time a saturation element is saturated in the system shown in FIG. 26.

As shown in FIG. 30, when the plant is saturated to a saturated value of ±0.2, the outputs z1 and z2 are clearly different from each other. Specifically, the output of the system model 300 suffers from integrator windup due to the plant saturation. As shown in FIG. 31, the estimated disturbance value Doc has an inaccurate waveform compared with the disturbance D.

Figure 32:
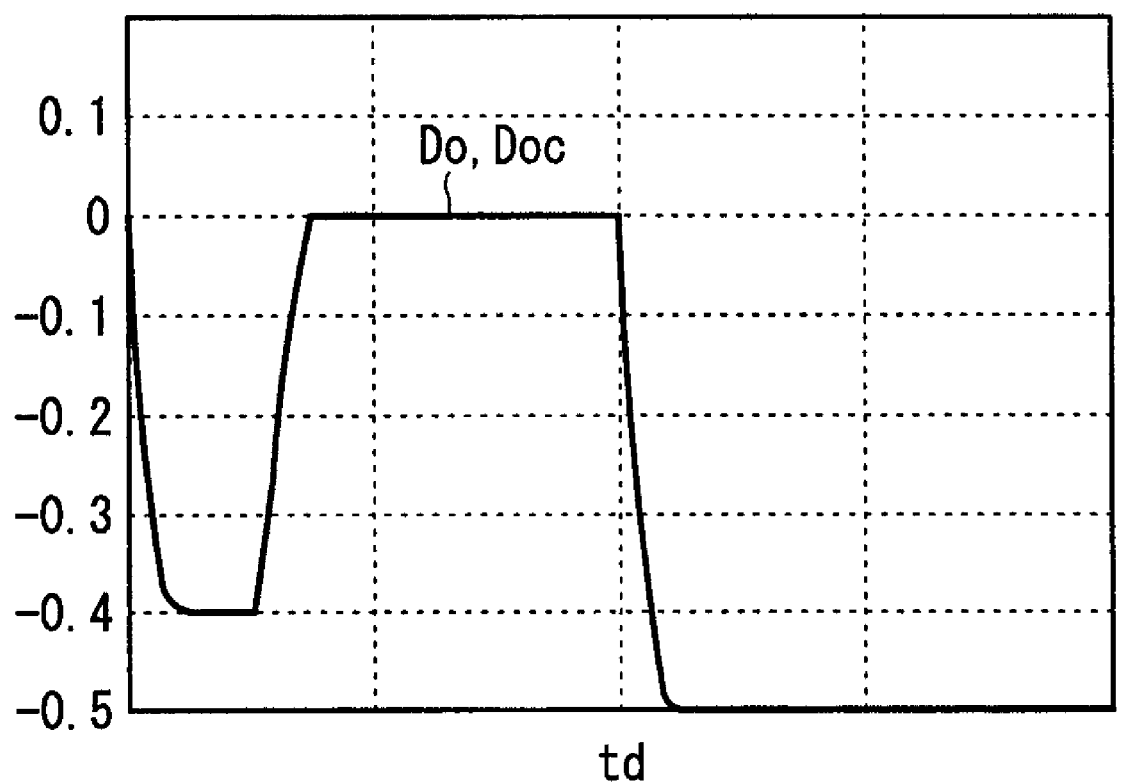
FIG. 32 is a diagram showing a simulated estimated disturbance value at the time a saturation element is saturated in the system shown in FIG. 27.

On the other hand, as shown in FIG. 30, the output z2 of the system model 310 indicates a suppressed integrator windup. It is thus confirmed that the saturated positive-feedback filter 110 is effective. As shown in FIG. 32, the estimated disturbance value Do converges to a proper estimated value within a short period of time.

As described above, the system model 310, which incorporates the saturated positive-feedback filter 110 in the disturbance observer 46, has integrator windup restrained as with the third system model 220 under PID control. Since the disturbance observer 46 is employed, the disturbance D is compensated for. If the step quantity of the command value R is reduced, then the integrator windup is further restrained.

Operation and advantages of the saturated value changer 50 in the positioning control system 10 shall be described below. The saturated value changer 50 serves to change the saturated value L (and −L) of the saturation element 48 based on an absolute value of the deviation $\epsilon$.

Figure 33:
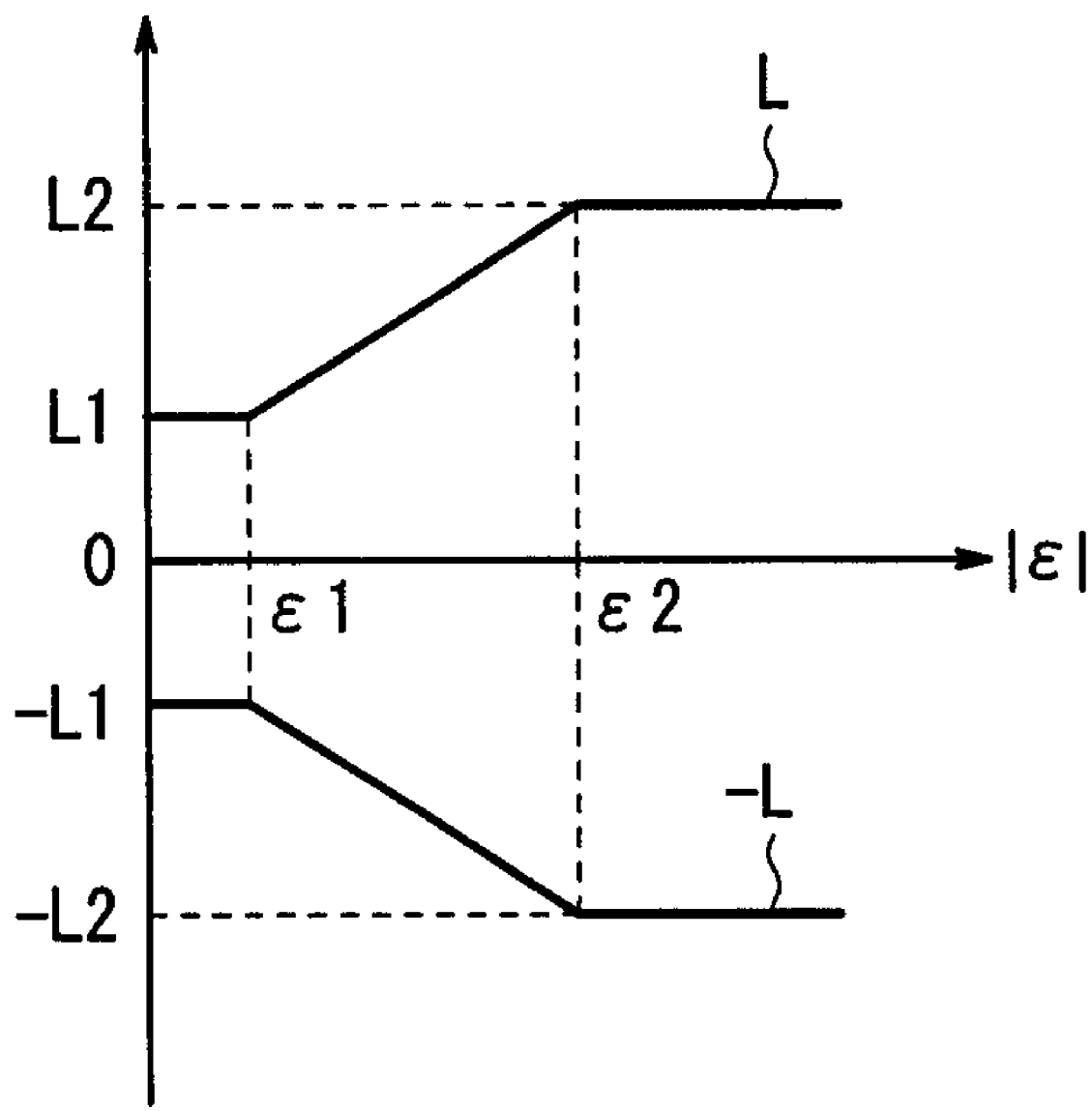
FIG. 33 is a graph showing saturated values set by a saturated value changer.

Specifically, as shown in FIG. 33, if the absolute value $|\epsilon|$ of the deviation $\epsilon$ is $|\epsilon|<\epsilon 1$, then the saturated value L is set to L←L1 or the saturated value −L is set to −L←−L1. The set value L1 is a sufficiently small value capable of sufficiently restraining integrator windup. If the absolute value $|\epsilon|$ is in the range of $\epsilon 1 \leq |\epsilon| < \epsilon 2$, then the saturated value L is proportionally increased (or the saturated value −L is proportionally reduced) dependent on the absolute value $|\epsilon|$ from the set value L1 as a reference for the positive saturated value (or from the set value −L1 as a reference for the negative saturated value). When $|\epsilon|=\epsilon 2$, the saturated value L is set to L=L2 or the saturated value −L is set to −L=−L2. When the absolute value $|\epsilon|$ is in the range of $|\epsilon|>e2$, the saturated value L is set to L←L2 or the saturated value −L is set to −L←−L2.

The reference value $\epsilon 1$ is of a numerical value for defining a range wherein the deviation $\epsilon$ is relatively small, and may be set to the viscoelastic displacement range Yo (see FIG. 2) due to the piston seal 32 (or a hypothetical combined seal including the piston seal 32 and the cap seal 34), or to a value that is slightly smaller than the viscoelastic displacement range Yo. When the piston 26 is displaced slightly within the viscoelastic displacement range Yo, integrator windup is sufficiently restrained, and the piston 26 is stably moved due to the viscoelastic characteristics of the piston seal 32 (or the hypothetical combined seal). Consequently, steady-state deviation is minimized for highly accurately and rigidly positioning the controlled object or, stated otherwise, thereby increasing the static characteristics.

The reference value E2 is of a numerical value for defining a range wherein the deviation $\epsilon$ is sufficiently large, and the maximum displacement is set to be equal to Ymax (see FIG. 1). As the absolute value $|\epsilon|$ increases, the saturated value L is also set to a larger value, making it possible to increase the manipulated variable Us for the proportional valve 40. In other words, when the absolute value $|\epsilon|$ of the deviation $\epsilon$ is large, the proportional valve 40 is actuated with a large stroke to move the piston 26 at a high speed, thereby enabling the displaced distance Y to quickly approach the command value R or, stated otherwise, thereby increasing the static characteristics.

Figure 34:
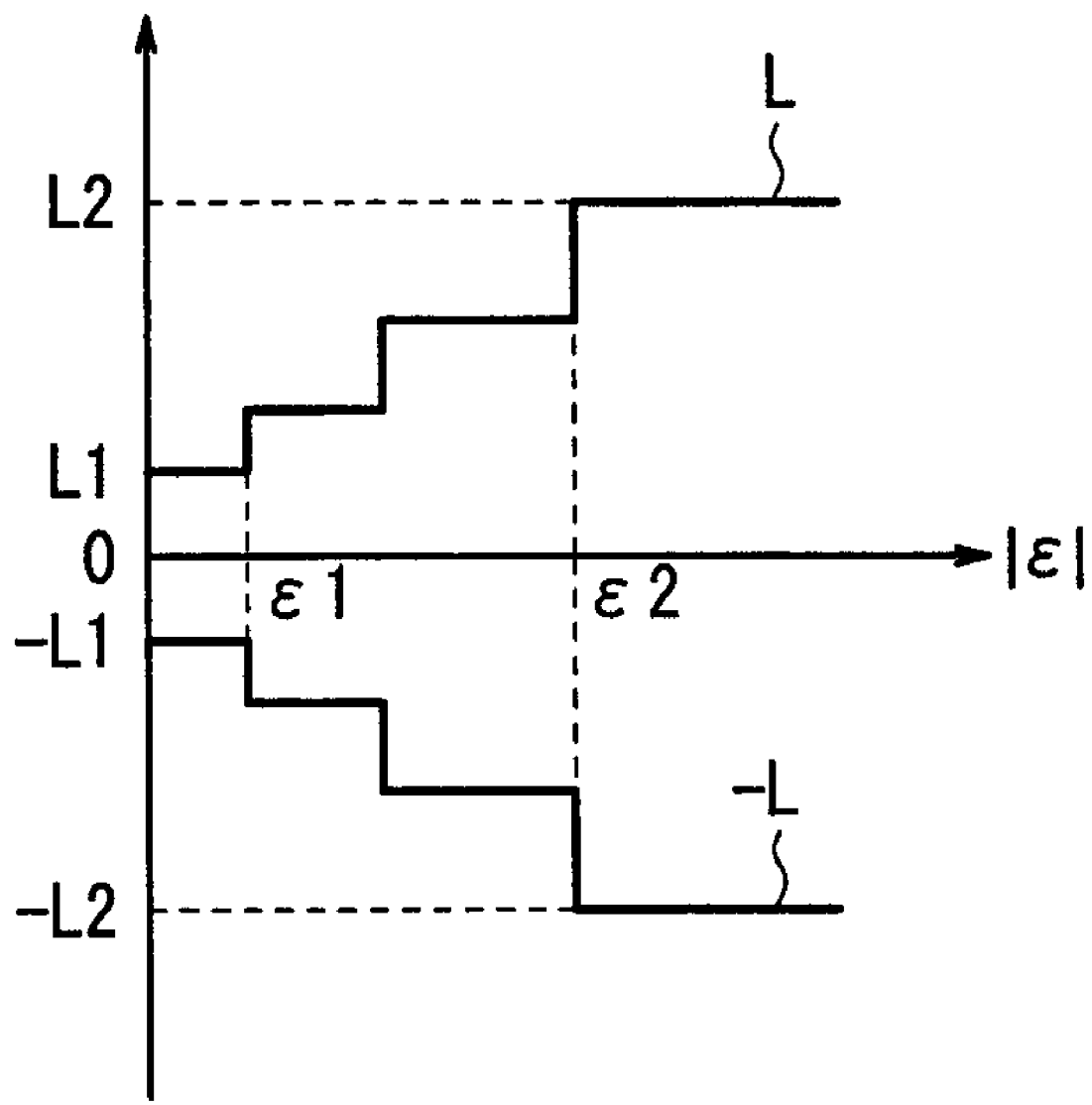
FIG. 34 is a graph showing modified saturated values set by the saturated value changer.
Figure 35:
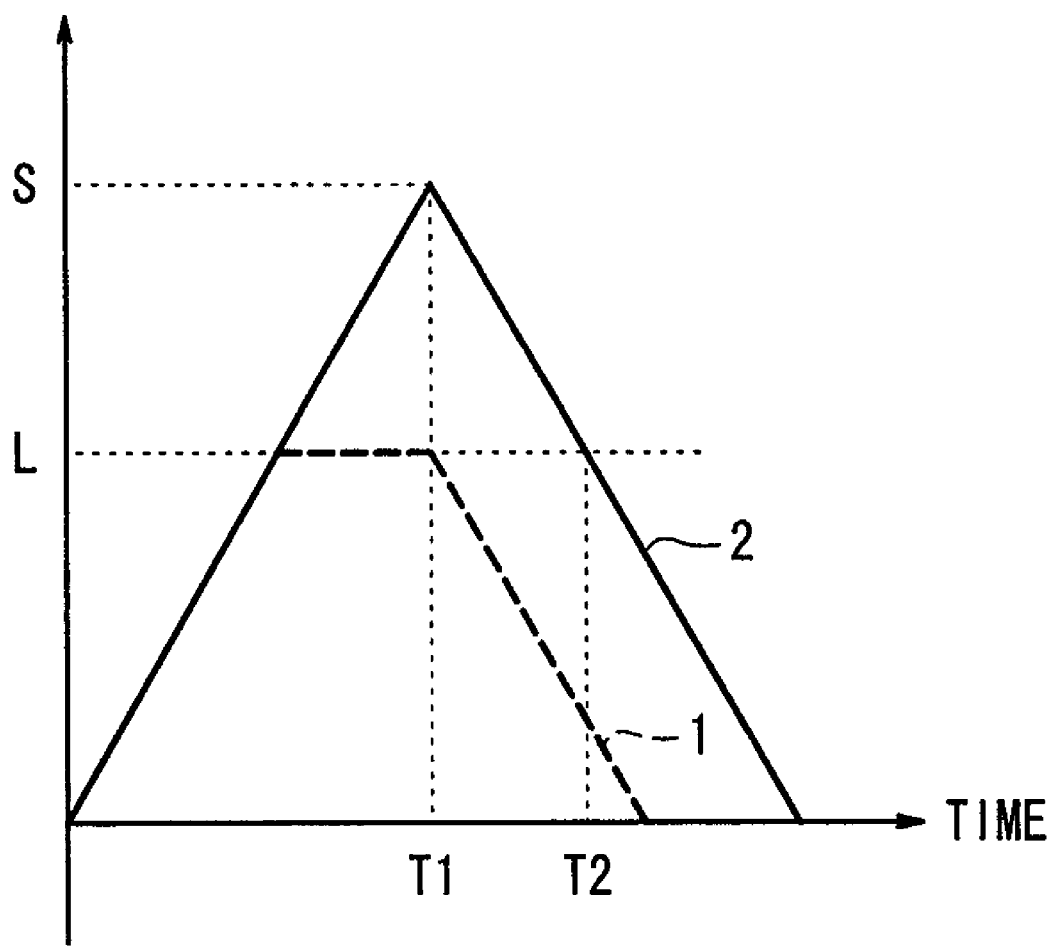
FIG. 35 is a timing chart of integrals produced by an integrator, which are illustrative of integrator windup.

The saturated values L and −L set by the saturated value changer 50 may be changed stepwise between the reference value $\epsilon_1$ and the reference value $\epsilon_2$, as shown in FIG. 34. Specifically, as the absolute value $|\epsilon|$ increases, the saturated value L is increased stepwise and the saturated value −L is reduced stepwise. The saturated value L may be changed stepwise by a simple comparison process, without requiring a proportional calculation process. The process of setting the saturated values L and −L stepwise, as shown in FIG. 34, provides the same advantages as those obtained when they are set as shown in FIG. 33. The same advantages are also achieved if the absolute value of the saturated value L of the saturation element 48 is greater when the deviation $\epsilon$ exceeds the viscoelastic displacement range Yo than when the deviation $\epsilon$ falls within the viscoelastic displacement range Yo.

As described above, the positioning control system 10 according to the present invention restrains integrator windup for enabling an increased control capability, with the saturation element 48 being disposed in the positive-feedback minor loop 70 of the disturbance observer 46. The disturbance observer 46 operates to compensate for the disturbance D in order to highly accurately and rigidly position the controlled object.

The saturated positive-feedback filter 110 according to the present invention operates in the same manner as an integrating process so as to restrain integrator windup, with the low-pass element Q being disposed in the feedback path of the positive-feedback minor loop, and the saturation element 48 being disposed in the forward path thereof.

Although certain preferred embodiments of the present invention have been shown and described in detail, it should be understood that various changes and modifications may be made to the embodiments without departing from the scope of the invention as set forth in the appended claims.

What is claimed is:

1. A positioning control system comprising:
 a disturbance observer for estimating a disturbance from at least one observed value of a controlled object and feeding back an estimated disturbance; and
 a saturation element disposed in a feedback loop for feeding back the estimated disturbance from said disturbance observer;
 said feedback loop having a main loop based on an output value of said controlled object, and a minor loop for performing positive feedback based on a predetermined parameter;
 said saturation element being disposed in said minor loop, the positioning control system further comprising a saturated value changer for changing a saturated value of said saturation element based on a control deviation, wherein said controlled object comprises a cylinder having a seal on a slidable component thereof, and said saturated value of said saturation element has an absolute value that is greater when said control deviation falls outside of the viscoelastic displacement range of said seal than when said control deviation falls within a viscoelastic displacement range of said seal.

2. A positioning control system according to claim 1, wherein said minor loop performs said positive feedback through two subtractors.

3. A positioning control system according to claim 1, wherein said saturation element is saturated with positive and negative values whose absolute values are equal to each other.

4. A positioning control system according to claim 1, wherein said cylinder comprises a pneumatic cylinder.

5. A positioning control system according to claim 1, wherein said seal comprises a piston seal and a cap seal.

6. A positioning control system according to claim 1, wherein said cylinder is bidirectionally actuatable by a proportional valve.

7. A positioning control system according to claim 1, wherein said saturated value changer changes said saturated value stepwise based on said control deviation.

8. A positioning control system according to claim 1, further including a filter, said filter comprising:
 said minor loop for performing positive feedback within said main feedback loop;
 a low-pass element disposed in a feedback path of said minor loop; and
 said saturated element, said saturated element being disposed in a forward path of said minor loop.

* * * * *